(12) United States Patent
Yang

(10) Patent No.: US 8,850,469 B1
(45) Date of Patent: Sep. 30, 2014

(54) DISTRIBUTION OF VIDEO IN MULTIPLE RATING FORMATS

(75) Inventor: Jianfeng Yang, San Jose, CA (US)

(73) Assignee: Google Inc., Mountain View, CA (US)

( * ) Notice: Subject to any disclaimer, the term of this patent is extended or adjusted under 35 U.S.C. 154(b) by 192 days.

(21) Appl. No.: 13/412,580

(22) Filed: Mar. 5, 2012

(51) Int. Cl.
*H04N 7/16* (2011.01)
*H04N 7/025* (2006.01)

(52) U.S. Cl.
USPC ............... 725/28; 725/32; 725/135; 725/139

(58) Field of Classification Search
CPC .............. H04N 21/26258; H04N 21/4825; H04N 21/8541
See application file for complete search history.

(56) References Cited

U.S. PATENT DOCUMENTS

| | | | | |
|---|---|---|---|---|
| 5,589,945 | A * | 12/1996 | Abecassis | 386/291 |
| 5,691,972 | A | 11/1997 | Tsuga et al. | |
| 5,987,211 | A * | 11/1999 | Abecassis | 386/343 |
| 6,115,057 | A * | 9/2000 | Kwoh et al. | 725/28 |
| 6,295,559 | B1 | 9/2001 | Emens et al. | |
| 6,694,090 | B1 * | 2/2004 | Lewis et al. | 386/261 |
| 8,185,921 | B2 | 5/2012 | Candelore | |
| 8,312,484 | B1 * | 11/2012 | McCarty et al. | 725/28 |
| 2003/0065957 | A1 * | 4/2003 | Tsuji et al. | 713/202 |
| 2004/0040034 | A1 * | 2/2004 | Sullivan et al. | 725/25 |
| 2004/0261093 | A1 * | 12/2004 | Rebaud et al. | 725/25 |
| 2006/0130121 | A1 | 6/2006 | Candelore et al. | |
| 2006/0184800 | A1 | 8/2006 | Rosenberg | |
| 2007/0124762 | A1 * | 5/2007 | Chickering et al. | 725/35 |
| 2007/0162343 | A1 | 7/2007 | Landesmann | |
| 2009/0249176 | A1 | 10/2009 | Jarman | |
| 2010/0095319 | A1 | 4/2010 | Tran et al. | |
| 2010/0293058 | A1 | 11/2010 | Maher et al. | |
| 2010/0333132 | A1 * | 12/2010 | Robertson et al. | 725/32 |
| 2011/0211814 | A1 | 9/2011 | Sarukkai | |
| 2012/0087634 | A1 * | 4/2012 | Lalwaney | 386/241 |
| 2012/0117585 | A1 * | 5/2012 | Curtis et al. | 725/25 |
| 2012/0131002 | A1 | 5/2012 | Rakshit | |
| 2012/0297423 | A1 | 11/2012 | Kanojia et al. | |

OTHER PUBLICATIONS

Office Action for U.S. Appl. No. 13/412,594, dated Jun. 6, 2012, 12 pages.
Office Action for U.S. Appl. No. 13/412,594, dated Dec. 14, 2012, 18 pages.

* cited by examiner

*Primary Examiner* — Benjamin R Bruckart
*Assistant Examiner* — Carmine Malangone
(74) *Attorney, Agent, or Firm* — Amin, Turocy & Watson, LLP

(57) ABSTRACT

Systems and methods for distributing, receiving, and playing a video in multiple rating formats are disclosed herein. A storage component stores video segments of a video, wherein different rating formats of at least one of the video segments are available for streaming to a streaming component. An identification component determines a desired rating format for the at least one of the video segments and a selection component selects and requests a subset of the video segments to be streamed based in part on the desired rating format. The streaming component then receives the subset of the video segments of the video.

18 Claims, 19 Drawing Sheets

US 8,850,469 B1

DISTRIBUTION OF VIDEO IN MULTIPLE RATING FORMATS

TECHNICAL FIELD

This disclosure relates to media streaming, and more particularly to distribution of video in multiple rating formats.

BACKGROUND

Media content including digital television and video is becoming widely accessible through Internet based hosts. As a result, the amount of media content available is increasing and the audiences reached are expanding. However, not all media content is suitable for all audiences. Media rating polices generally apply a rating to media content in order to signify the appropriate viewing audience. Often times, audiences are restricted from viewing media content because the rating associated with the media content prevents viewing ability.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with streaming video in multiple rating formats.

In accordance with a non-limiting embodiment, in an aspect, a system is provided comprising a streaming component that receives a subset of video segments of a video wherein different rating formats of at least one of the video segments are available for streaming. The system further includes an identification component that determines a desired rating format for the at least one video segment and a selection component that selects and requests the subset of video segments to be streamed based in part on the desired rating format.

In accordance with another non-limiting embodiment, a method is provided that comprises receiving a subset of video segments of a video, wherein different rating formats of at least one of the video segments are available for streaming. The method further includes determining a desired rating format for the at least one video segment and in turn, selecting and requesting the subset of video segments to be streamed based in part on the desired rating format.

Further, provided is a device comprising means for receiving a subset of video segments of a video, wherein different rating formats of at least one of the video segments are available for streaming. The device can further include means for determining a desired rating format for the at least one video segment, and means for selecting and requesting the subset of video segments to be streamed based in part on the desired rating format.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

DETAILED DESCRIPTION

Figure 1:
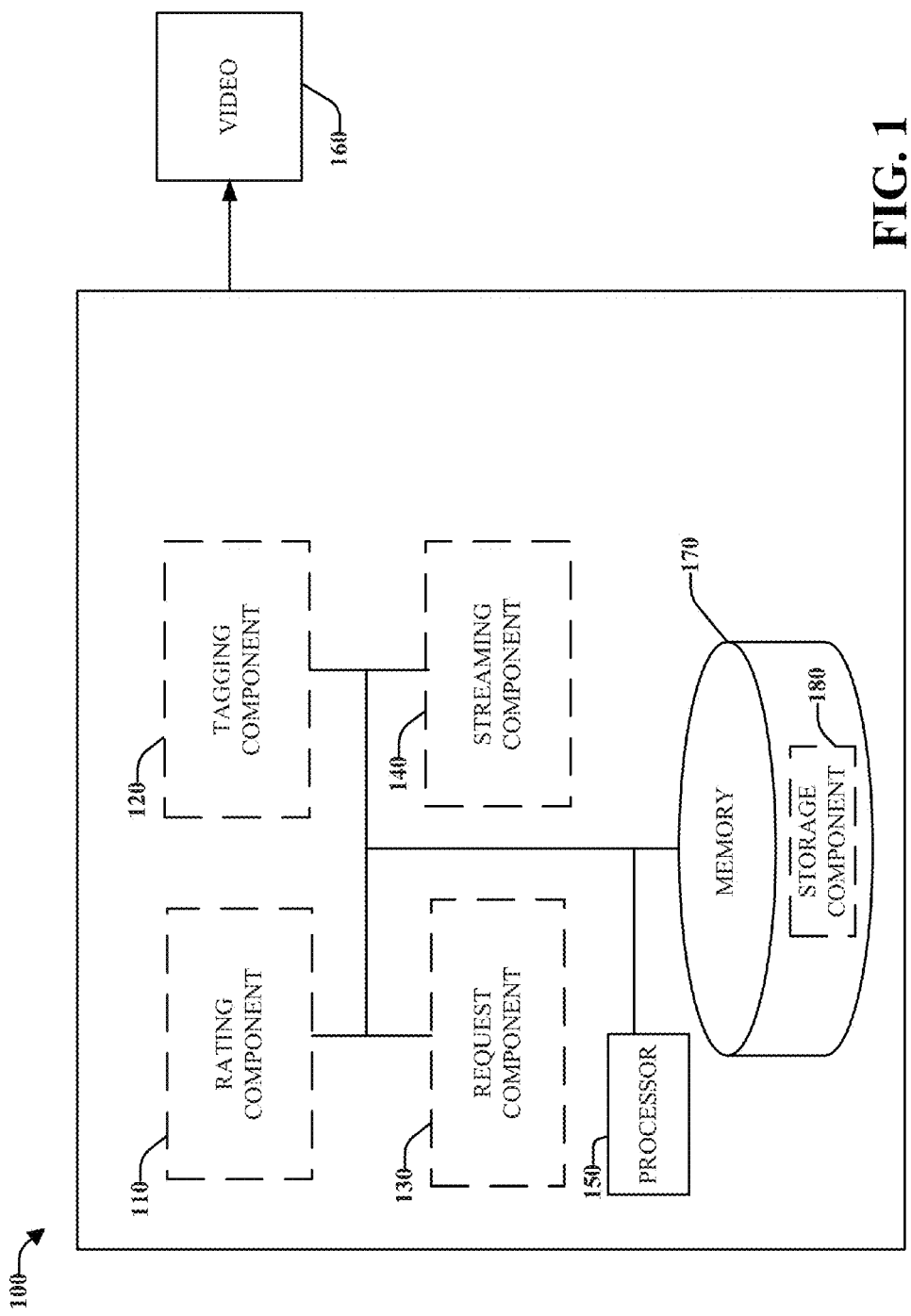
FIG. 1 illustrates an example non-limiting system that facilitates providing video in multiple rating formats in accordance with various aspects and implementations described herein.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

It is to be appreciated that in accordance with one or more embodiments or implementations described in this disclosure, users can opt-out of providing personal information, demographic information, location information, proprietary information, sensitive information, or the like in connection with data gathering aspects. Moreover, one or more embodiments or implementations described herein can provide for anonymizing collected, received, or transmitted data.

Referring now to the drawings, with reference initially to FIG. 1, a media system 100 that facilitates providing video in multiple rating formats is presented. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 170 for storing computer executable components and instructions. A processor 150 can facilitate operation of the computer executable components and instructions by the system 100.

In an embodiment, system 100 can include rating component 110, tagging component 120, request component 130, streaming component 140, and storage component 180. System 100 represents a system employed on one or more server computers or devices which provides videos having different rating formats to client devices/applications. In an aspect, a storage component 180 stores a video file. The rating component 110 further receives user designated rating information for respective segments of the video file and tagging component 120 tags the respective video file segments with the user designated rating information. The respective video file segments can be associated with different rating information, and subsets of the video file segments can be grouped based on the rating information to result in multiple versions of the video file. As a result, in another aspect, storage component 180 can store video content in multiple rating formats. In turn, request component 130 can receive a request for video content in one of the multiple rating formats, and streaming component 140 can provide the video content based on the requested rating format.

As used herein, video content can include video data associated with one or more data sources that can be accessed by a client device or by a media system such as system 100 (and additional systems described in this disclosure). In an aspect, a data source can include a data store storing video content and internal to system 100. For example, storage component 180 can include a data store storing video content. It should be appreciated that storage component 180 can be associated with memory 170 of system 100 and/or separate from memory 170. In another aspect, a data source can include a data store storing video content and affiliated with a content provider that interacts with the media system 100. For example, storage component 180 can be remote from system 100 and accessible by system 100. Video content can include various types of video 160 including but not limited to movies, television, streaming television, advertisements or video games.

In an aspect, media system 100 (and additional systems described in this disclosure) provide video to a client device (not shown). A client device can include any suitable computing device associated with a user and configured to interact with or receive media content. For example, a client device can include a desktop computer, a laptop computer, a smartphone, a tablet personal computer (PC), or a PDA. As used in this disclosure, the terms "content consumer" or "user" refer to a person, entity, system, or combination thereof that employs media system 100 (or additional systems described in this disclosure) via a client device. In an aspect, a client device or media system 100 (or additional systems described in this disclosure) can be configured to access the video segments 160 via a network such as for example the Internet, intranet, or cellular service.

In one embodiment, storage component 180 stores video content in a manner that enables the video content to be rendered in multiple versions or formats. In an aspect, different versions of a video can account for different ratings or rating formats of the video such that a single video can be provided in different rating formats. In particular, a video or movie is often associated with a rating format which is intended to restrict the audience of the video or movie. For example, the motion picture association of America's film-rating system (MPAA) is used in the United States and its territories to rate a film's thematic and content suitability for certain audiences. The MPAA applies the following ratings to movies: G—indicating general audiences wherein all ages are permitted, PG—indicating parental guidance is suggested wherein some material may not be suitable for children, PG-13—indicating parents are strongly cautioned wherein some material may be inappropriate for children under 13, R—indicating restricted wherein individual under the age of 17 require an accompanying parent or adult guardian, and NC-17 or X indicating no one 17 and under can be admitted. It should be appreciated that a variety of rating systems can be applied to videos in accordance with aspects herein. Further, the rating system applied and the manner in which a video receives a particular rating is not essential to the subject disclosure.

In an aspect, video content can be associated with multiple rating formats in storage component 180 by encoding multiple different video segments into a video file comprising the video content in a manner that allows a client application to read and play selected video segments from the multiple different video segments. Such a video file is referred to herein as an adaptable rating format video file. For example, a single video file can comprise of multiple segments wherein one or more of the segments are associated with a different rating. The single video file can further be encoded in a language such as extensible markup language (XML) or other machine readable language, that defines parameters for playing subsets of the multiple different segments. For example, a single video may comprise segments A, B1, B2, and C and may be encoded to be played as segments A, B1, and C as a default on any client device. The video file may further be encoded to be played as segments A, B2, and C on a client device providing authorization information to allow playing of segments A, B2, and C. According to this example, version A/B1/C can result in the playing of a G rated version of the video file while playing of version A/B2/C can result in a PG13 rated version of the video file.

In another aspect, a single video file associated with a data source, including storage component 180, may comprise of multiple segments wherein one or more of the segments are associated with a different rating, and in order to play a subset of the segments which results in the video being played in a particular version, the video file can be encoded with one or more cue segments. According to this aspect, a cue segment can include a computer readable language segment that precedes segments of a video that are interchangeable based on rating and defines parameters for the playing one of the interchangeable segments. For example, a video file may comprise of three segments A, B, and C. Segment B may further consist of segments B1 and B2, wherein one of B1 or B2 is played at a client device and a cue segment indicates which of segments B1 or B2 to play. The cue segment can cue a client to play segment B1 according to certain first parameters and to play segment B2 according to certain second parameters. According to this example, version A/B1/C can result in the playing of a first rated version of the video (such as G rated version of the video file) while playing of version A/B2/C can result in the playing of a second rated version of the video (such as PG13 rated version of the video file.

In another embodiment, a video file 160 can be stored and divided as set of video segments, wherein segments include one or more segments or portions of a video file less than whole video file. For example, in an aspect, a video can be stored in storage component 180 as a single video file and downloaded to or streamed to a client device as a single video file in the encoded formats discussed above. However, in another aspect, a video 160 can be streamed to a client as a sequence of multiple pieces or segments. For example, a video file can include two hours of video and a segment of the video file can be referenced, for example, by time 1:30:01 to 1:41:00. In another aspect, a segment of the video file can be referenced by a set of video frames. For example, a video file can include M frames (M is an integer), and a segment of video content of the video file could include frames 1 to 57, frames 7008 to 8001, or frames 678 to M, for example.

In an aspect, a video can comprise of multiple segments where at least one of the segments is provided in different rating formats and available for streaming. For example, a video can comprise of multiple segments, where most of the segments have a G rating format, some of the segments have a PG-13 rating format, and another portion of the segments have an R rating format. According to this aspect, a segment of video is associated with a single rating format where at least one of the total segments of the video has a different rating format than another. In another example, a video can comprise of multiple segments where one or more of the segments are available in multiple rating formats. According to this example, a single segment of a video may be available in multiple rating formats such as a G rated format and a PG-13 rated format. In order to provide a single segment of video in various formats for example, a producer of the video may record the video in different forms. For example, the producer of the video may record a version of a video with profanity spoken and also record a version of the video with language substituted for the profanity.

According to this embodiment, a video 160 can comprise of multiple video segments 160 which can further be arranged into different subsets of video segments. Subsets of video segments 160 of a video can be provided in different M3U (motion picture experts group (MPEG)—3Universal Resource Locator) playlists in storage component 110. In an aspect, each of the subsets of video segments 160 (i.e. each of the different M3U playlists), can represent a different version of the video. According to this aspect, a single video can be provided in a variety of different versions. In order to view the video in a particular version, a client can request to receive the M3U playlist (i.e. select the subset of video segments) of the video which portrays the particular version of the video. In an aspect, a video can comprise of any number of M segments where M is an integer, and where different versions of the video differ by at least one segment.

A single video can thus be associated with multiple M3U playlists stored in storage component 180 where each playlist portrays the video in a different rating format. For example, a video may comprise of 100 segments. Of those 100 segments, segments 1-99 may be associated with a G rating while segment 100 may be associated with a PG-13 rating. For example, segment 100 may receive a PG-13 rating for the inclusion of adult content, violence, profanity and etc. The video can therefore be provided in a G version M3U playlist which includes only segments 1-99 that are associated with the G rating and a PG-13 version M3U which includes all 100 segments.

It can be appreciated that different versions of a video can share a majority of video segments. In other words, a video may be modified into different rated versions through minimal editing by deleting adding, and/or exchanging a small percentage of the total video segments of the video. Various subsets of video segments embody different versions of a video provided in different M3U files. In an aspect, each of the M3U playlists comprise substantially the same video segments and have a small percentage of different segments which account for the different ratings of the M3U playlists.

In an embodiment, in order to generate video content that can be rendered in multiple versions or formats, storage component 180 can store unrated video files which can receive rating information. In an aspect, the unrated video content can include a video file comprising multiple segments. Rating component 110 can further receive user designated rating information for respective segments of the video file. For example, a user can provide encoding information that indicates an appropriate rating for a segment of a video based on content. In another aspect, rating component 110 can employ media analysis software to identify features of media content. For example, the rating component 110 can employ video analysis software to determine movement of objects, characteristics of object, the identity of objects, changes in dimensions of objects (such as changes in dimensions associated with close ups and fade outs), the colors present in different frames of a media item, the text written in a media item, the words spoken and inflection in the words spoken in a media item, sounds, instruments, or characteristics of music. The rating component 110 can further infer or determine an appropriate rating for respective segments of a video based on computer identified characteristics.

Once rating component 110 has received rating information for a segment of a video file, tagging component 120 tags the video file segments with the rating information. In an aspect, tagging component 120 component encodes the segment of the video file with instructions indicating the rating and/or rules for rendering of the segment when played at a client. For example, tagging component 120 can employ XML encoding and encode a video segment such that a client application understands how and when to play the segment based on the audience viewing the segment. In another aspect, tagging component 120 can encode the segment with a tag that comprises embedded metadata indicating a rating associated with the segment and/or requirements for rendering the segment at a client. Still, in yet another aspect, the tagging component 120 can further generate a cue segment in the video file. The cue segment can comprise of a computer readable language segment that precedes segments of a video that are interchangeable based on rating and defines parameters for the playing one of the interchangeable segments.

Referring back to FIG. 1, request component 130 receives requests for video. In one aspect, the request component may receive a request for a video regardless of format. According to this aspect, if the video is formatted to be played in a multiple versions, the request component can offer the client a choice prompt to receive a particular version. In turn, the client device can provide the request component 130 (i.e. the request component can receive) with a selection of a particular desired rating format for the video. In another aspect, if the video is formatted to be played in a multiple versions, the request component 130 can merely provide the client with the video file and at the time of playing, the client application may select the version of the video file to play (e.g. using XML coding or cue segments).

In another aspect, the request component 130 can receive an initial request for a video in a desired rating format. For example, the request component can receive a request for a version of a video that is available in one of at least two rating formats. In an aspect, the request can indicate a desired video and desired rating format of the video. In order to indicate a desired rating format for the video, a user may directly provide the actual rating format desired, such that a request may comprise of "provide me with movie, Sunny Day in Cleveland, in the PG rated version." In another aspect, in order to indicate a desired rating format for the video, the request may indirectly comprise of or prompt media system 100 to determine or infer, authorization information that defines an appropriate format to provide a requested video in. For example, a request may include an email address associated with a user account, wherein the user of the user account is only allowed to receive G rated versions of videos. In addition, the request can directly or indirectly indicate the encoding format that results in the rendering of a video in a desired rating format. For example, the request can indicate whether to provide the client with a single video file encoded with XML language or cue point that directs the manner of playing of the video file or whether to provide the client with a streamed M3U playlist version of the video.

Streaming component 140 provides requested video to a client. In an aspect, streaming component streams or downloads a video file to a client in response to a request. In another aspect, streaming component 140 streams a subset of video segments based on the requested rating format which results in the playing of the requested video in the requested rating format. In an aspect, streaming component 140 generates a version of the video in a desired rating format at the time of the request by editing the video to include segments which fit the desired rating format. In another aspect, where the storage component 110 already includes M3U playlists which comprise of video segments accounting for the desired rating format, the streaming component 140 can merely stream the stored M3U having the desired rating format. In an aspect, the streaming component 140 can employ an HTTP-based media streaming communications protocol that works by breaking the overall stream into a sequence of small HTTP-based file downloads, each download loading one short chunk of an overall potentially unbounded transport stream. For example, the streaming component can employ HTTP Live Streaming (HLS).

According to this embodiment, streaming component 130 can stream segments of video from media system 100 on multiple different streams. For example, video 160 can be streamed as multiple segments from system 100 via a hypertext transfer protocol (HTTP) based media streaming communication system that breaks a whole data stream into a sequence of small HTTP-based file downloads. Each download loads one short segment or chunk of an overall potentially unbounded transport stream. As the stream is played on a client device, the client may select from a number of different alternate streams containing the same material encoded at a variety of data rates, allowing the streaming session to adapt to the available data rate. At the start of the streaming session, the client downloads an extended M3U playlist containing the metadata for the various sub-streams which are available.

Figure 2:
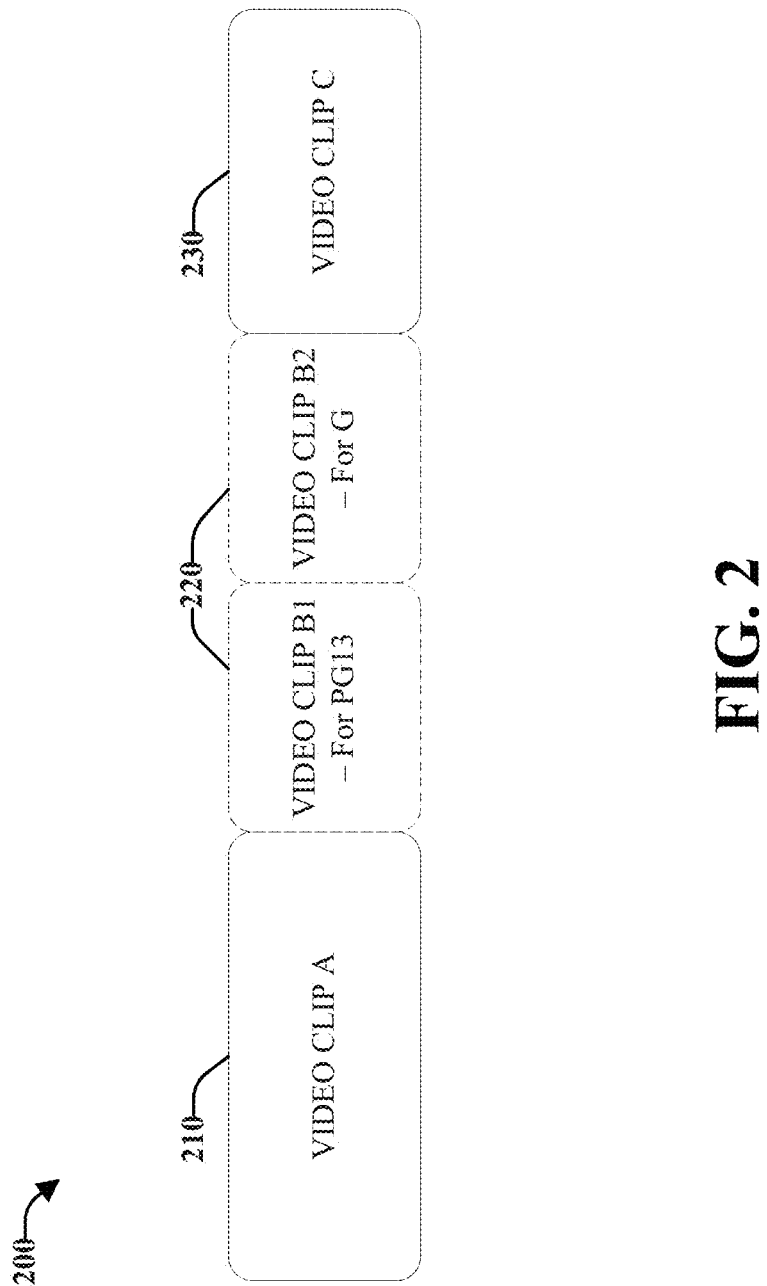
FIG. 2 illustrates an example non-limiting depiction of an adaptable ratings format video file in accordance with various aspects and implementations described herein.

FIG. 2 presents an example non-limiting depiction of an adaptable rating format video file 200 in accordance with an embodiment. Video file 200 comprises of multiple segments encoded in a language such as extensible markup language (XML) or other machine readable language, that defines parameters for playing subsets of the multiple different segments. Video file 200 comprises three segments including segment 210 associated with video claim A, segment 220 associated with video clips B1 and B2, and segment 230 associated with video clip C. Video file 200 is formatted to be played at a client device in a rating format as a function of the XML encoding and audience information. For example, video clips A, B1, B2, and C and may be encoded to be played as segments A, B1, and C as a default on any client device. The video file 200 may further be encoded to be played as video clips A, B2, and C on a client device providing authorization information to allow playing of segments A, B2, and C. According to this example, version A/B1/C can result in the playing of a G rated version of the video file while playing of version A/B2/C can result in a PG13 rated version of the video file.

Figure 3:
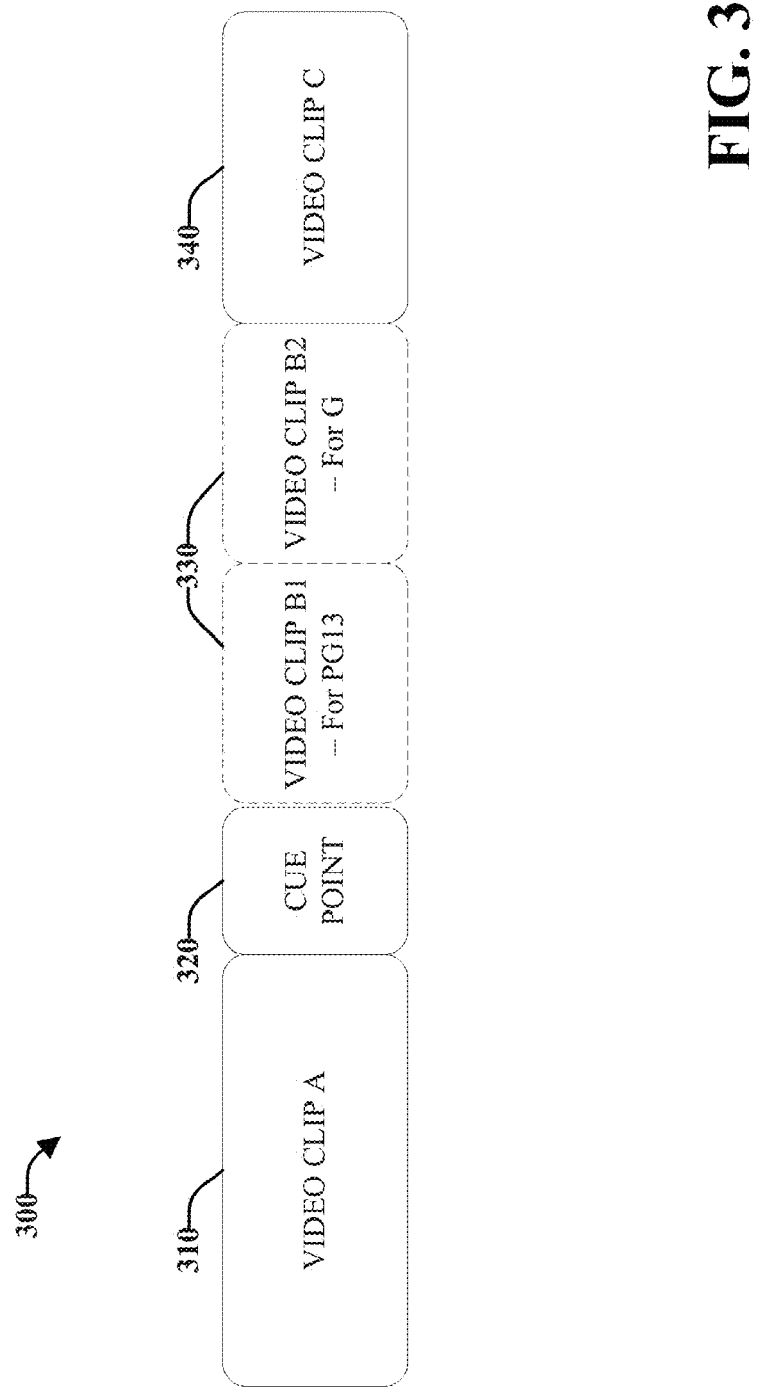
FIG. 3 illustrates an example non-limiting depiction of an adaptable ratings format video file in accordance with various aspects and implementations described herein.

FIG. 3 presents another example non-limiting depiction of an adaptable rating format video file 300 in accordance with an embodiment. Video file 300 comprises of multiple segments 310, 320, 330, and 340, wherein one or more of the segments are associated with a different rating, and in order to play a subset of the segments which results in the video being played in a particular version, the video file can be encoded with one or more cue segments 320. According to this aspect, a cue segment 320 can include a computer readable language segment that precedes segments 330 of the video that includes video clips B1 and B2 which are interchangeable based on rating. For example, a cue segment 320 can cue a client to play segment B1 according to certain first parameters (e.g. absence of audience authorization information) and to play segment B2 according to certain second parameters (e.g. receipt of audience authorization information). According to this example, version A/B1/C can result in the playing of a first rated version of the video (such as G rated version of the video file) while playing of version A/B2/C can result in the playing of a second rated version of the video (such as PG13 rated version of the video file.

Figure 4:
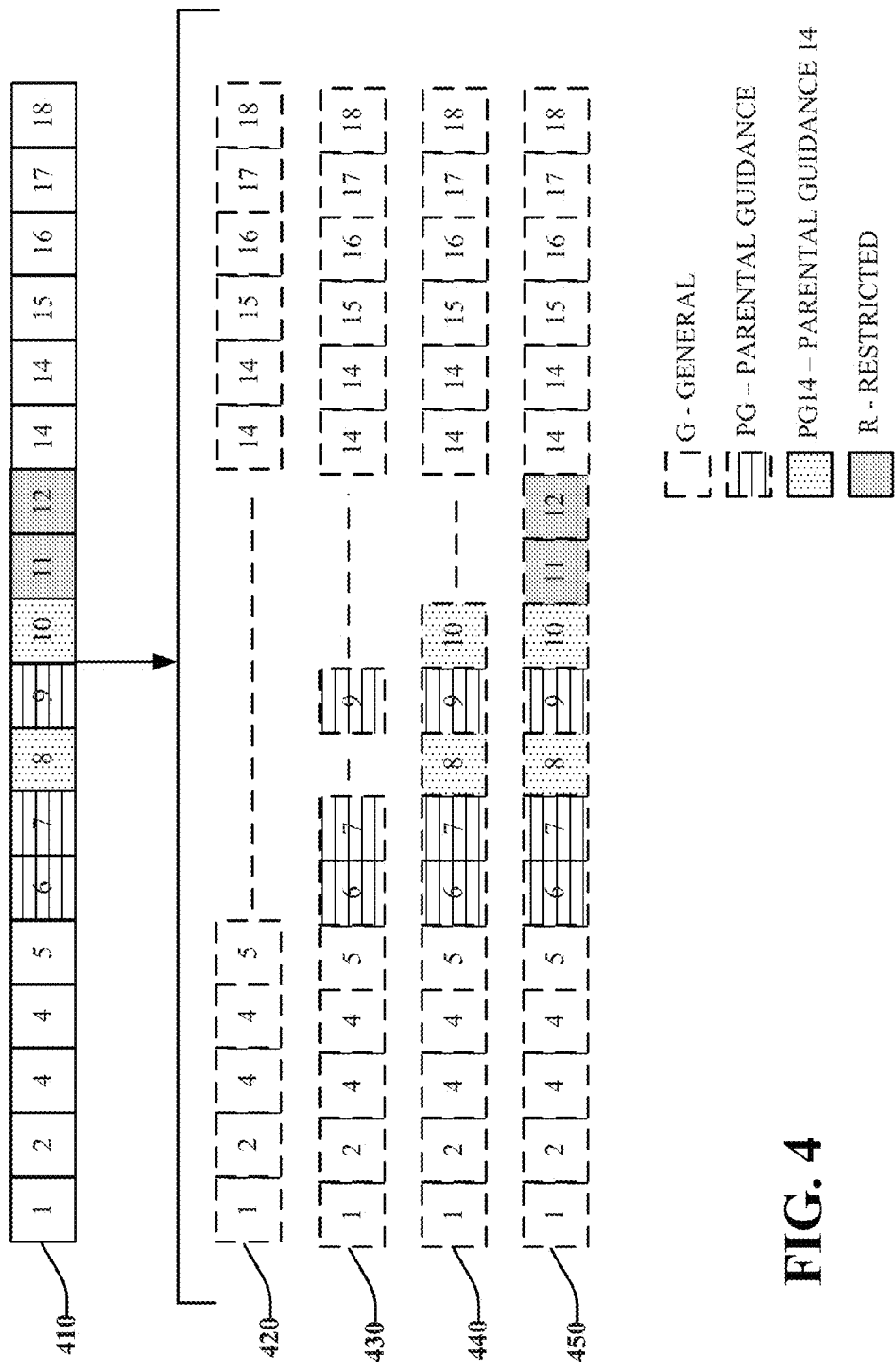
FIG. 4 illustrates an example non-limiting depiction of a video file comprising video segments, wherein different rating formats of at least one of the video segments are available for streaming in accordance with various aspects and implementations described herein.

Referring now to FIG. 4, presented is diagram depicting a video file 410 comprising video segments 1-18, wherein different rating formats of at least one of the video segments are available for streaming. Video file 410 is presented with 18 video segments for simplicity. It can be appreciated that a video file can have any number M (M being an integer) of video segments. As seen in FIG. 4, video file 410 is depicted having video segments with four different ratings including G, PG, PG-13 and R. In an aspect, video file 410 can be transmitted in at least four versions or rating formats including versions 420, 430, 440, and 450. For example, version 450 can include all of the segments of video file 410, including those having a G rating, PG rating, PG-13 rating and an R rating. In an aspect, version 450 can be afforded an overall rating of R based on the inclusion of the highest rated segments being rated R. Version 430 can include the segments of video file 410 having a rating of PG-13, PG, and G. In an aspect, version 430 can be afforded an overall rating of PG-13 based on the inclusion of the highest rated segments being rated PG-13. Version 440 can include the segments of video file 410 having a rating of PG, and G. In an aspect, version 440 can be afforded an overall rating of PG based on the inclusion of the highest rated segments being rated PG. Lastly, version 420 can include the segments of video file 410 having a rating of G. In an aspect, version 420 can be afforded an overall rating of G based on the inclusion of the highest rated segments being rated G.

Figure 5:
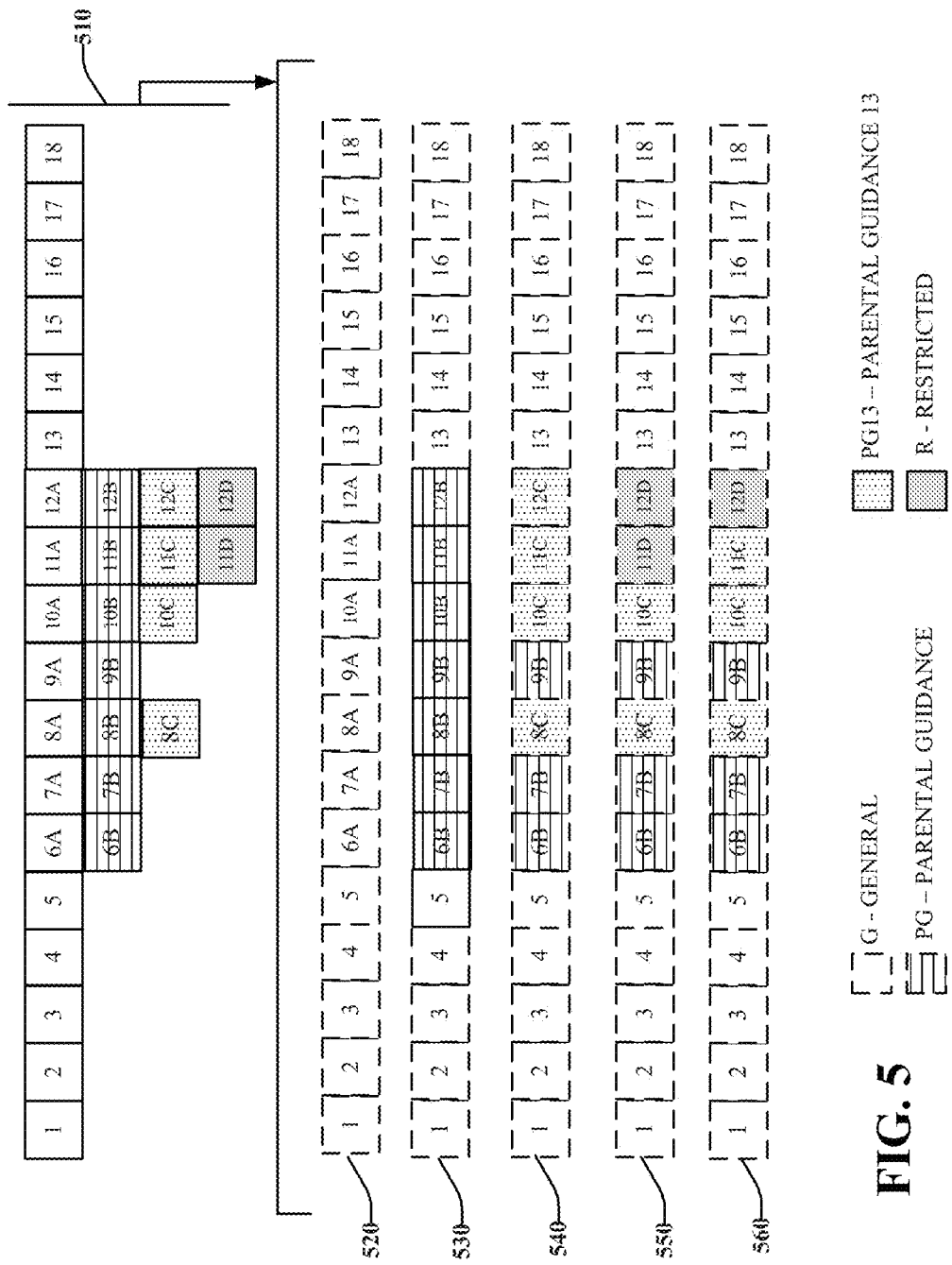
FIG. 5 illustrates an example non-limiting depiction a video file comprising video segments, wherein different rating formats of at least one of the video segments are available for streaming in accordance with various aspects and implementations described herein.

Referring to FIG. 5, presented is another embodiment of a diagram depicting a video file 510 comprising video segments 1-18, wherein different rating formats of at least one of the video segments are available for streaming. In particular, in video segments 6-12 of video file 510 comprise of multiple segments having different ratings including G, PG, PG13 and/or R. Segment 6 comprises of two segments, 6A having a G rating, and 6B having a PG rating. Segment 7 also comprises of two segments, 7A having a G rating, and 7B having a PG rating. Similarly, segment 9 also comprises of two segments, 9A having a G rating, and 9B having a PG rating. Segment 8 comprises of three segments, 8A having a G rating, 8B having a PG rating, and 8C having a PG-13 rating. Segment 10 also comprises of three segments, 10A having a G rating, 10B having a PG rating, and 10C having a PG-13 rating. Further, segment 11 comprises of four segments, 11A having a G rating, 11B having a PG rating, 11C having a PG-13 rating, and 11D having an R rating. Similarly, segment 12 comprises of four segments, 12A having a G rating, 12B having a PG rating, 12C having a PG-13 rating, and 12D having an R rating. In an aspect, the different versions of any of the segments can comprise substantially the same content which has been edited to add, remove, or modify the characteristics of the content responsible for a rating. Further, although video file 510 is depicted as having 18 segments, it can be appreciated that a video file can have any number M (M being an integer) of video segments.

In an aspect, video segment 510 can be transmitted in a variety of versions or rating formats including but not limited to versions 520 through 560. For example, version 550 can include all of the highest rated of any video segments of video file 510, available such that version 550 can be afforded an overall rating of R based on the inclusion of the highest rated segments being rated R. Version 540 can include PG13 segments where available and where not available the highest rated segments under the PG13 rating such that version 540 can be afforded an overall rating of PG-13 based on the inclusion of the highest rated segments being rated PG-13. Version 530 can include PG segments where available and where not available G rated segments such that version 520 can be afforded an overall rating of PG based on the inclusion of the highest rated segments being rated PG. Version 520 can include only G rated version of segments 1-18 of video file 510 such that the overall rating of version 520 can be G.

Version 560 demonstrates a situation where a hybrid version of a video can be transmitted. A hybrid version of a video includes mixed segments of video having different rating restrictions based on characteristics of the content of the segment for which the rating is based. According to this aspect, a rating of the version of the video is not necessarily based on the highest rated segment. On the contrary, segments of different rating can be included or excluded in a version of the video because of the rating and the characteristics of the content of the segment for which the rating is based. For example, with respect to version 560, unlike version 550 which includes R rated versions for segments 11 and 12 (i.e. 11D and 12D respectively), version 560 includes the PG-13 rated version for segment 11 and the R rated version for segment 12 (i.e. 11C and 12D respectively). According to this example, user authorization information may authorize viewing of PG13 rated videos, with the exception that segment rated R for violence are also authorized. Thus in furtherance to the above example, it can be appreciated that segment 11D is rated R for a reason other than violence while section 12D is rated R for violence.

Figure 6:
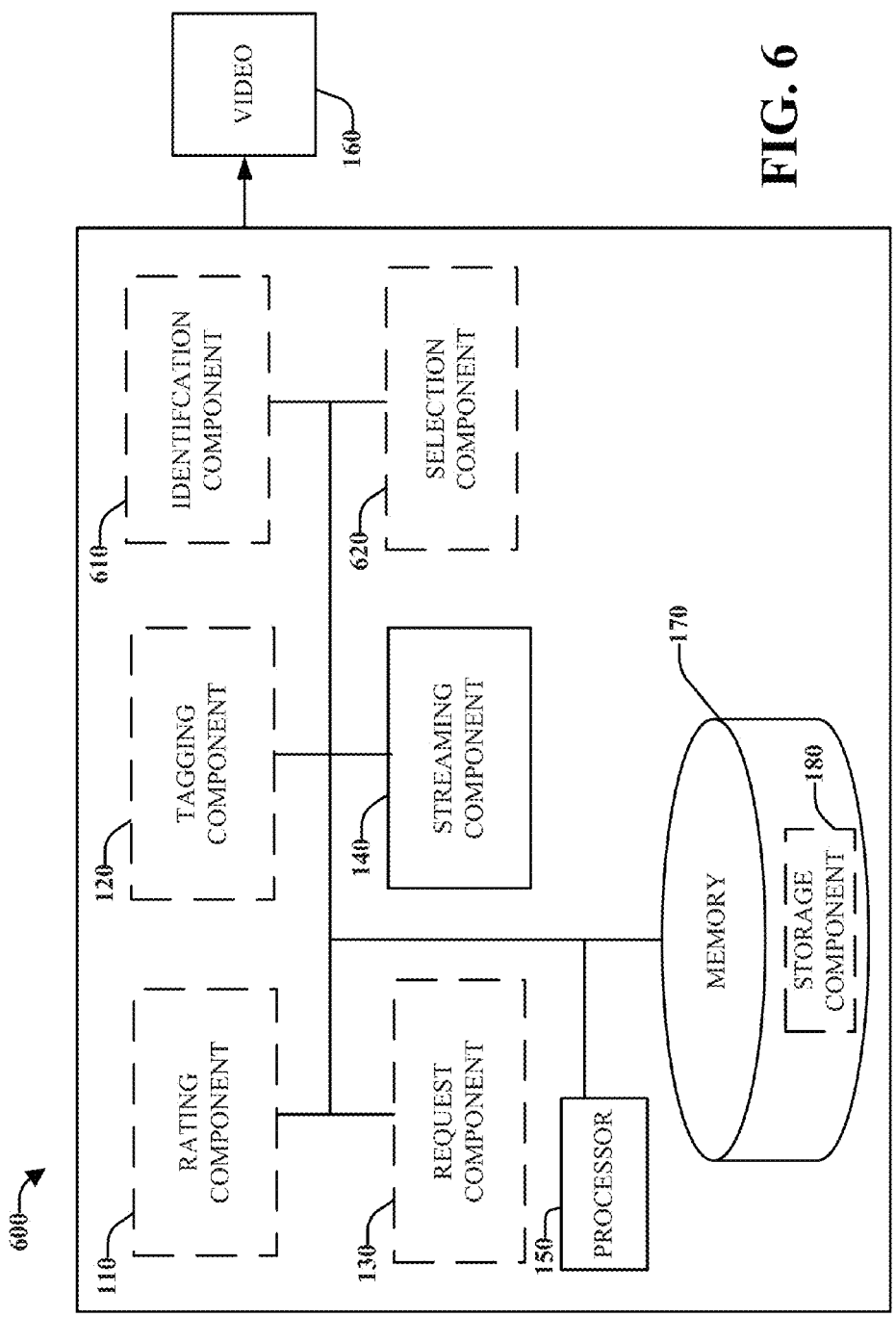
FIG. 6 illustrates an example non-limiting system that facilitates providing video in multiple rating formats in accordance with various aspects and implementations described herein.

With reference now to FIG. 6, presented is another exemplary non-limiting embodiment of a media system 600 that facilitates providing video in multiple rating formats in accordance with the subject disclosure. System 600 includes identification component 610 and selection component 620 to facilitate providing video to users in an appropriate rating format. Selection component 620 selects segments of a video to transmit based on a request for the video. In an aspect, the identification component 610 first identifies an appropriate rating format for the video based on a request for the video and the selection component 620 selects the segments of the video to transmit which result in rendering of the video in the appropriate rating format at a client.

Storage component 180 stores tagged segments of videos such that each segment of a video can be associated with a rating. Selection component 620 selects certain subsets of the tagged segments based on a request. In an aspect, the selection component 620 selects subsets that result in the rendering of the video in a desired rating format. In an aspect, the rating format of a subset of video segments is a product of the respective ratings of the segments included therein. The rating format of a video may be a function of the highest rated video segment. For example, the MPAA rating system rate movies a G, PG, PG-13, R, and X, where G is the lowest rating and X is the highest rating. According to the MPAA rating system, if a video includes an R rated segment as its highest rated segment it will be afforded an R rating. In an aspect, the selection component 620 determines a desired rating format for at least one video segment of a video where the video has multiple segments and at least one of the segments has a different rating format from another.

In an aspect, the selection component 620 determines a desired rating format for the at least one segment as a function of a total desired rating to be afforded to the video. For example, if a desired rating format for a video is PG-13, the selection component 130 determines the desired rating format for each of the video segments to have a rating of PG-13 or below. In turn, the selection component 620 selects the subset of video segments for transmission based in part on the desired rating format. For example, the selection component 620 may respond to a request for a video in a G rating format. In turn, the selection component 620 can select the subset of video segments 160 of a video which have a G rating only.

In another embodiment, the selection component 620 may select segments of a video based on a request for a nontraditional or hybrid rating format for a video to be played based on different ratings for different video segments. According to this embodiment, a video segment may receive a rating for a variety of reasons. For example, a video segment may be afforded an R rating for adult content or violence. In an aspect, a user or parent of a user may be comfortable with viewing some segments of a video in a first rating and not comfortable with viewing other segments of the video in the first rating where the basis for first rating in the various segments is different. For example, a user or parent of a user may be comfortable with viewing R rated video segments wherein the R rating is attributed to violence, however the user or parent of the viewer may not be comfortable with viewing R rated segments of video wherein the R rating is attributed to adult content. In that case, the user or parent of the user may be only comfortable with viewing adult content video segments having a PG-13 rating.

In view of the example above, rather than restricting viewing of the entire video to only those segments having a PG-13 rating and below, the selection component 620 can determine a hybrid version of the video that has different rated segments based on content based characteristics of those segment. For example, the selection component 120 can determine a first desired rating format for a first video segment, and a second desired rating format for a second video segment, wherein the first desired rating format is different from the second desired rating format. In turn, the selection component 620 can select the subset of video segments to be streamed based in part on the desired rating formats.

In order to accommodate the above embodiment, in an aspect, video segment can be associated with metadata that includes rating information for the respective segments and characteristics of the content of the respective segments for which the rating information is based. For example, a video segment can be associated with metadata indicating an R rating for adult content. In another example, a video segment can be associated with metadata indicating a PG rating for violence. Further, different hybrid M3U playlist can comprise of a variety of subsets of video segments which mix video segments having different rating for different content characteristics. When selecting the subset of video segments to be streamed based in part on two or more desired rating formats conditioned upon content, the selection component 130 will select a hybrid M3U playlist version of the video.

In an embodiment, request component 130 can receive a request for a video that explicitly indicates a desired rating format for the video. For example, the request can request system 600 to, "provide video ABC in a PG13 rating." According to this embodiment, the selection component 130 can select segments of video ABC which result in the rendering of the video in a PG13 rating at a client. For example, storage component 180 can store a set of rated segments of the video and selection component 620 can select a subset of the segments which when combined, result in the playing of the video at in a desired rating format. In an aspect, the subset of segments may result in exclusion of segments which have an undesired rating and/or the inclusion of segments which have a desired rating. In turn, the streaming component 140 can stream and/or transmit the subset of the segments.

In another aspect, the storage component 180 can store multiple rated versions of a same video segment of the video. According to this aspect, the selection component 620 can select one of the multiple rated versions of the same video segment for transmission. The selection component 620 can further select additional segments of the video that have a requested rating format. In turn, the streaming component 140 can stream the video as a series of segments, where the series of segments includes the additional segments and the one of the multiple rated versions of the same video segment and exclude other rated versions of the same video segment.

Still, in yet another embodiment, the request component 130 may receive a general request for a video that does not specify rating format or specifies an adaptable rating format of the video. According to this embodiment, the selection component 130 can select an adaptable rating format video file of the video and streaming component can transmit the adaptable rating format video file of the video. The adaptable rating format video file can comprise the multiple rated versions of the same video segment and be the formatted to play one of the multiple rated versions of the same video segments based on a receiving device. For example, the adaptable rating format video file comprise XML encoding or a cue segment providing read rules.

In an embodiment, the request component 130 may receive a request for a video file that does not explicitly indicate a desired rating format, however identification component 610 determines an appropriate rating format based on the request. According to this embodiment, identification component 610 determines a desired rating format for a video where a video is available in multiple rating formats. In an aspect, the identification component 610 determines the desired rating format for a video to be provided in response to a request as a function of authorization information associated with the request. For example, the identification component 610 may identify a user and/or client device associated with a request and further determine authorization information associated with the user and/or client device. In an aspect, the authorization information can be provided by the user and/or client device to system 600 (e.g. in the form of a user account or user profile) and be stored in memory 170 and be accessed by the identification component 610. The identification component 610 can employ a variety of methods in order to determine authorization information associated with a request. For example, the identification component 610 can associate a request with an account of a user through association of a username, a password, an email account and etc.

According to this aspect, a video viewer/user may be permitted to view a video in various versions based on authorization information associated with the user via his or her client device. For example, the MPAA ratings restrict viewing audiences at the ages of 13 and 17. In an aspect, the identification component 610 determines the desired rating format for a video to be provided in response to a request as a function of user age. Further, in an aspect, the user's age can be associated with and provided by the user's client device. Thus authorization information can include a user's age and the identification component 610 can determine a desired rating format which has been previously deemed appropriate for the user's age either by the MPAA system, or another rating system.

In another aspect, authorization information can authorize providing of a video based on parameters tailored to the user and/or the client device associated with a user. For example, a user and/or user device associated with a request may provide the identification component 620 with tailored information providing parameters for authorization of viewing videos in different rating formats. According to this aspect, authorization information may generally authorize an individual to view videos in any rating format, regardless of generally accepted age restrictions. For example, the authorization information may authorize an individual who is 15 to view videos only in G rated formats. Still in yet another aspect, the authorization information may authorize viewing of videos in a first rating format during weekdays and a second rating format during weekends. Still in yet another aspect, the authorization information may account for a variety of factors including a user's age, location, context, a videos title, a video's cast, a video's producer, or a videos reviews. Authorization information can further provide various parameters for authorization of a viewing of video segments based on the ratings of the segments and the content basis for which the respective ratings are attributed. For example, authorization information can authorize a user to view only PG-13 rated video segments and below which are afforded the rating for adult content and/or profanity. However, the authorization information may also authorize the same user to view video segments having an R rating an below where the R rating is attributable to violence.

Figure 7:
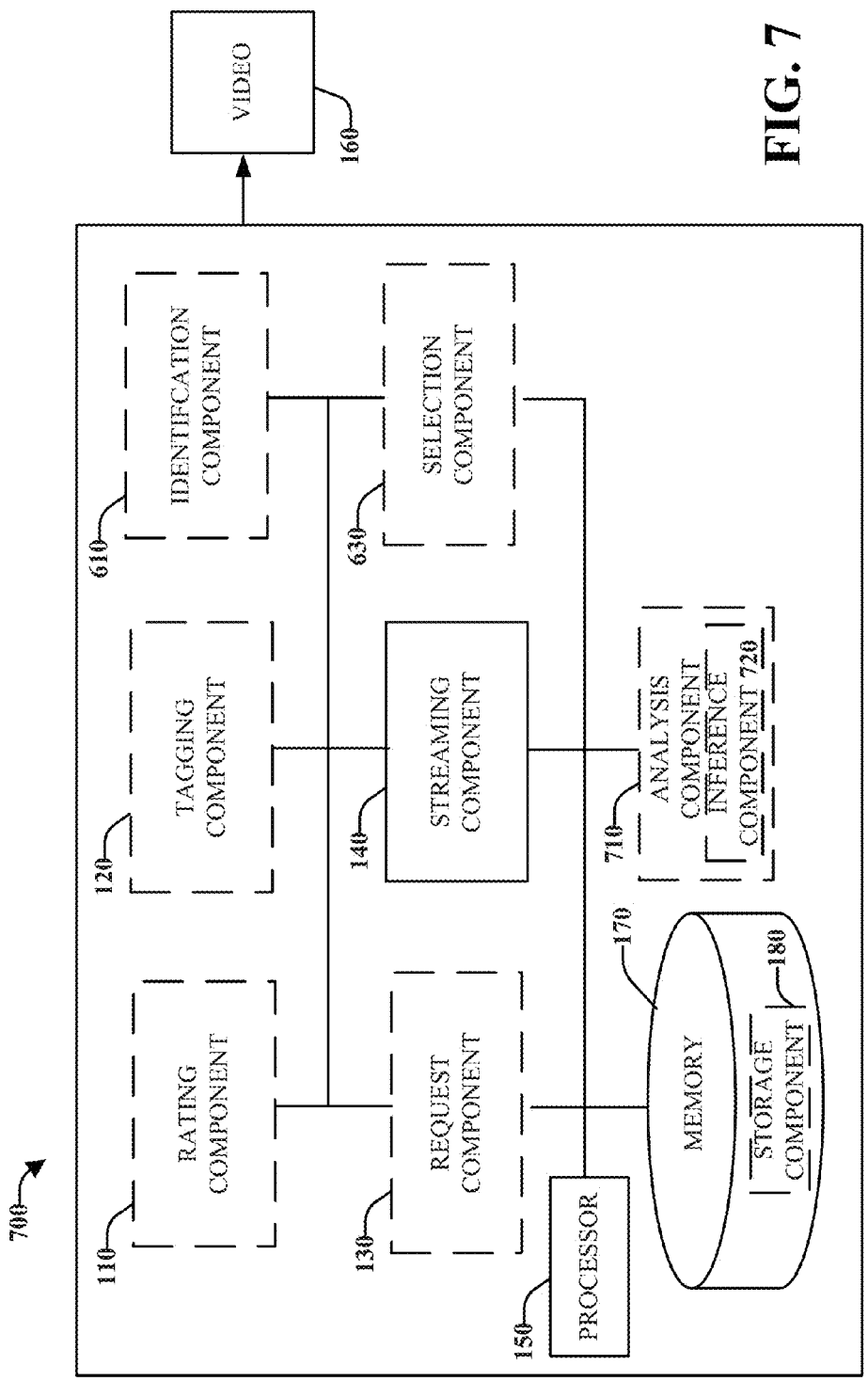
FIG. 7 illustrates an example non-limiting system that facilitates providing video in multiple rating formats in accordance with various aspects and implementations described herein.

With reference to FIG. 7, presented is another exemplary non-limiting embodiment of a media system 700 that facilitates providing video in multiple rating formats in accordance with the subject disclosure. In an aspect, system 600 providing receiving video in multiple rating formats based on an identified desired rating format associated with a request. System 700 can include analysis component 710 that can aid in various determinations and/or inferences upon which the identification component 610 may determine a desired rating format of video segments to be provided by the streaming component 140.

In an aspect, analysis component 710 determines the context of a client device at which a video is to be played or is being played. In turn, the identification component 610 can determine the desired rating format for the subset of video segments to be streamed by the streaming component 110 as a function of the client device context. In particular, the identification component 610 can identify a rating format for the subset of video segments to be streamed to the client device which are appropriate given the context of the client device associated with a request.

The context of a client device can include any information related to the physical environment of a client device as well as the virtual activity and/or usage of the client device and surrounding devices. In an embodiment, the context of a client device can include the location of the client device, the characteristics of the devices and their associated users surrounding the client device, as well as characteristics of individuals within viewing range of a client device. For example, analysis component 710 may determine the context of client device at which a video is to be played includes an elementary school classroom wherein children around the ages of 6 years old are gathered.

Analysis component 710 can employ any suitable method or means for determining location of a client device. In an aspect, the analysis component 710 can receive global positioning system (GPS) information from a client device associated with a request in order to determine the location of a client device. In another aspect, the analysis component 710 can receive location information from a client device associated with a request through assisted GPS (AGPS), time based locating methods, multilateration, or any other mobile device tracking methods. In particular, in an aspect, the analysis component 710 can be configured to determine location of a client device associated with a request inside enclosed or covered structures, such as buildings.

In an embodiment, context includes characteristics of users surrounding a client device associated with a request. For example, the analysis component 710 may determine the ages of users or individuals within viewing proximity and/or auditory range of a client device at which a video is being played or to which a video will be streamed. Similarly, the analysis component 710 may determine viewing authorization information of users and/or individuals within viewing proximity and/or auditory range of a client device at which a video is being played or to which a video will be streamed. In an aspect, the analysis component 710 can determine the youngest age of one or more users or individuals within viewing proximity and/or auditory range of a client device associated with a request and to which a video will be streamed. In turn, the identification component 610 can determine the desired rating format as a function of the youngest age of the one or more users or individuals viewing proximity and/or auditory range of a client device associated with a request to which the video will be streamed.

In an aspect, the analysis component 710 can determine changes in context of a client device in which a video is being played or to which a video will be streamed. For example, the analysis component 710 can determine when a new user begins to view and/or receive a video at a client device or when a new user or individual becomes within viewing proximity and/or auditory range of a client device at which a video is being played or to which a video is being streamed. In turn, the selection component 620 can update the selected subset of video segments to be streamed by the streaming component 140 as a function of the new user. For example, the selection component 620 can update the selected subset of video segments to be streamed by the streaming component 140 as a function of age and/or authorization information of the new user.

In an embodiment, the analysis component 710 can employ an inference component 720 to facilitate making inferences or determinations in connection with determining context of a client device associated with a request. In addition, inference component 720 can facilitate the identification component 610 in inferring and/or determining an appropriate rating format for segments of a video to be provided to a client device as a function of device context, user preferences, user age, user authorization information, user demographics, user location, and user viewing intent.

In order to provide for or aid in the numerous inferences described in this disclosure (e.g., inferring client device context and appropriate rating format for a video to be provided to a client device), inference component 720 can examine the entirety or a subset of data to which it is granted access and can provide for reasoning about or inferring relevancy to and desirability of viewing respective media segments by respective content consumers. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events or data.

Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 8:
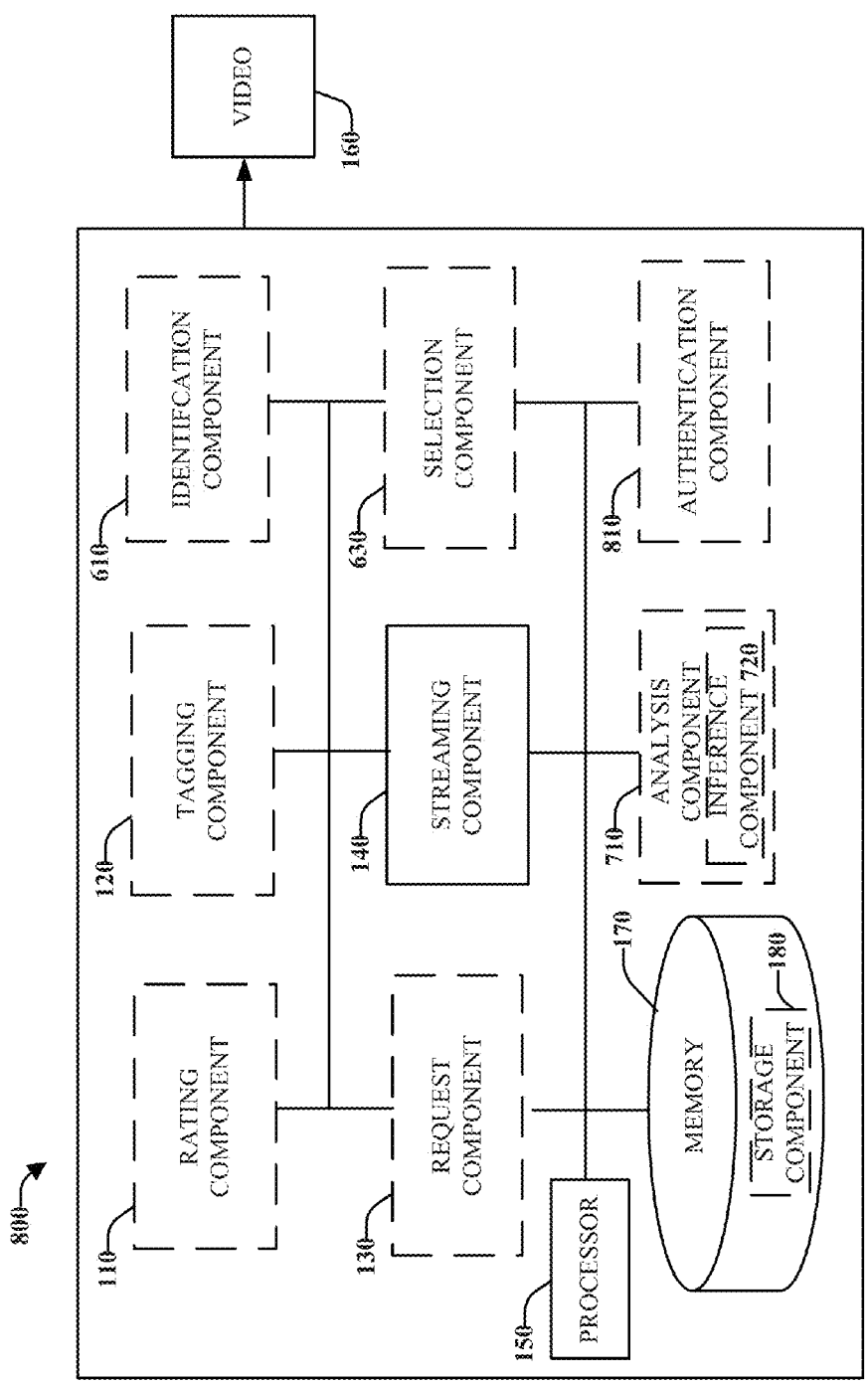
FIG. 8 illustrates an example non-limiting system that facilitates providing video in multiple rating formats in accordance with various aspects and implementations described herein.

With reference to FIG. 8, presented is another exemplary non-limiting embodiment of a media system 800 that facilitates providing video in multiple rating formats in accordance with the subject disclosure. System 800 employs authentication component 810 to determine the age of one or more users associated with a request. In an aspect, authentication component 810 determines the ages of one or more users based on context information determined by the analysis component 610. In another aspect, the authentication component 810 determines the age of the one or more users associated with a request via authentication information associated an identified user making a request that is in memory 170 or other another data store remote from system 800 and accessible by authentication component. For example, multiple users may provide login and identification information to authentication component in order to request and receive video from system 800. In another aspect, the authentication component 810 may identify a user making a request via an IP address, email address, phone-number associated with requesting device, or other identification number associated with a requesting device. According to this example, the authentication component 810 can determine the authorization information of a user making a request, such as her age, based on her login and identification information which is further linked to her user profile (e.g. stored at system 800 or stored remotely at a social networking website), or the like, that comprises her authentication information. Further, the selection component 610 can select the desired rating format for segments of a video to be streamed by the streaming component as a function of the youngest age of the one or more users requesting a video to be viewed by the users in a same location on a same device.

Figure 9:
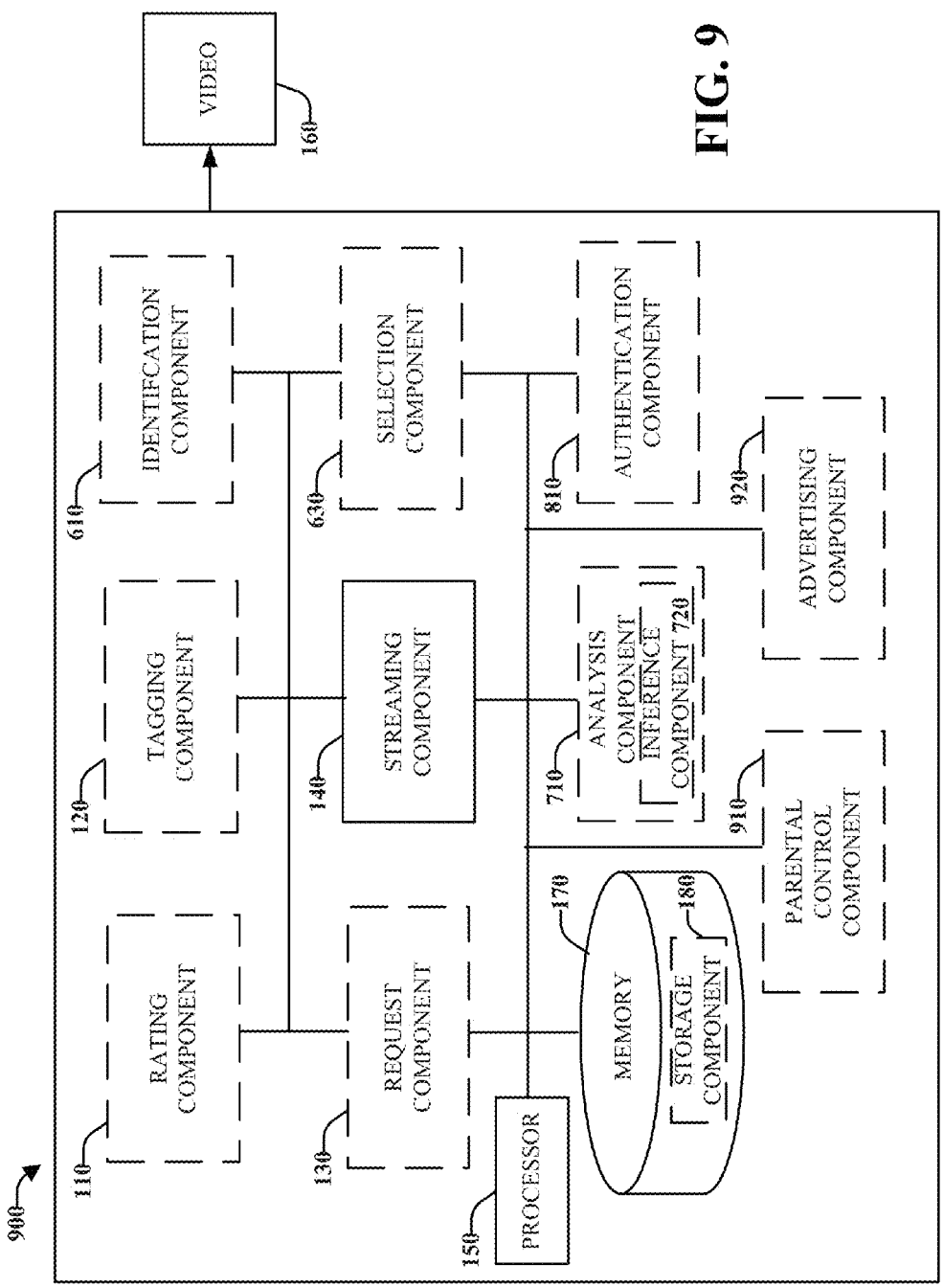
FIG. 9 illustrates an example non-limiting system that facilitates providing video in multiple rating formats.

With reference to FIG. 9, presented is another exemplary non-limiting embodiment of a media system 900 that facilitates receiving video in multiple rating formats in accordance with the subject disclosure. System 900 can include parental control component 910 and/or advertising component 920. Permission to view movies in various rating formats is often policed by parents or guardians of children. In addition, permission to view videos in various formats in general may be required by a school system or other authoritative entity. System 900 includes parental control component 910 that facilitates policing and authorizing permissions to view videos segments in various rating formats. In an aspect, parental control component 910 sets one or more default rating formats for video segments to be provided in response to a request. In an aspect, parental control component 910 allows a parent, guardian, or otherwise authoritative personnel to manually set parameters governing viewing permissions of users to which a video segments are to be provided. For example, a mother may have several children on a family phone plan. She may employ the parental control component 910 to set limits on the rating formats for videos in which each of her children may view on their respective smartphone devices. In another aspect, the parental control component 910 may automatically institute default settings for providing videos in desired appropriate rating formats based on a the age or context of a user associated with a request. The parental control component 910 can employ various security provisions that enable only authorized individuals to set or modify default format requirements.

In another embodiment, system 900 can further includes advertising component 920. Advertising component 920 matches advertisements to video as a function of the rating information respectively tagged thereto. Advertising is often presented to a general audience that may include many disinterested viewers and fails to include many interested viewers. Similarly, certain advertisements may be inappropriate for certain audiences. Advertising component 920 can employ rating information associated with a segment to insert an advertisement near the segment appropriate for the audience, likely to have impact on particular content consumers, relevant to user interest, or likely to capture content consumer attention. For example, the advertising component 920 can apply advertisements to video based on the rating format in which it is provided to a client. According to this example, if selection component selects to provide a video in G rating format, the advertising component 920 can apply advertisements targeted to children. Similarly, if selection component 620 selects to provide a video in an R rating format, the advertising component 920 can apply advertisements targeted to adults.

In another aspect, because each segment of a video can be associated with rating information, the advertising component 920 can insert advertisements near segments to be played based on the rating information. For example, the a video may include a stretch of segments that have a G rating and a short burst of segments having an R rating for violence. The advertising component can in turn apply low key G rated advertisements during or preceding the G rated stretch of segments and provide an advertisement rated R for violence following the R rated segments. It should be appreciated that a video can be dynamically provided by system 900 in multiple rating formats. Accordingly, advertisements can also be dynamically provided and interchanged with video based on the rating format in which the video is provided.

The advertising component 920 can also determine good matches between respective advertisements, rated video segments and associated video rating format, target audience, geography, user demographics, purchasing history, etc. in order to facilitate optimizing advertising in connection with provisioning of content. Moreover, the advertising component 910 can facilitate pricing of advertising impressions. For example, a content provider can charge a premium for display of an advertisement applied to a video rendered in an R version which is more popular than the version of the video rendered in the G version.

Figure 10:
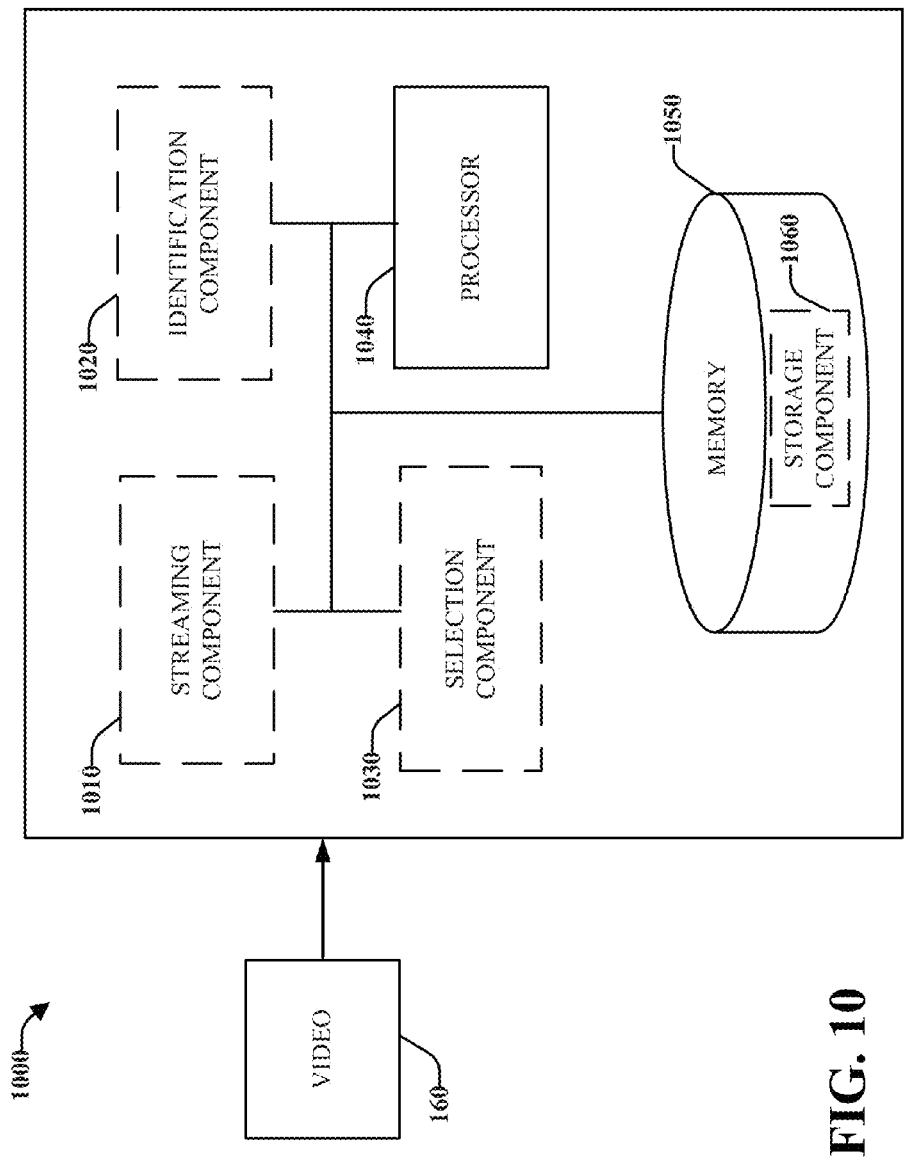
FIG. 10 illustrates an example non-limiting system that facilitates receiving video in multiple rating formats in accordance with various aspects and implementations described herein.

Referring now to FIG. 10, presented is a media system 1000 that facilitates receiving video in multiple rating formats. In an aspect, systems presented in FIGS. 1 and 6-9 can be embodied on a server device while systems presented in FIGS. 1000-1400 can be embodied on a client device. However, it can be appreciated that all systems described herein can be provided on a same device, and/or that component of all systems described herein can be grouped on a same device in any manner. System 1000 can include memory 1500 for storing computer executable components and instructions. A processor 1400 can facilitate operation of the computer executable components and instructions by the system 1000.

In an embodiment, system 1000 employs a streaming component 1010, an identification component 1020, and a selection component 1030. System 1000 receives and processes media items, including video 1060 streamed thereto. In an aspect, streaming component 1010 receives a subset of video segments of a video. Different rating formats of at least one of the video segments are available for streaming to the streaming component 1010. Identification component 1020 determines a desired rating format for the at least one video segment, and selection component 1030 selects and requests the subset of video segments to be streamed based in part on the desired rating format.

A video can be divided into a set of video segments where video segments include one or more segments or portions of a video file less than whole video file. In an aspect, media system 1000 can receive a single video file, such as an adaptable rating format video file comprising rated video segments. However, in another aspect, a video can be streamed to media system 1000 as a sequence of multiple pieces or segments. In an aspect, segments of a video 160 can be streamed to media system 1000 on multiple different streams. For example, video 160 can be streamed to system 1000 via a hypertext transfer protocol (HTTP) based media streaming communication system that breaks a whole data stream into a sequence of small HTTP-based file downloads.

System 1000 can receive video from one or more data sources that can be accessed by a client device or by media systems such as system 1000 (and additional systems described in this disclosure). In an aspect, system 1000 receives video from media systems described with reference to FIGS. 1, and 6-9. For example, a data source can include a data store (e.g. data store 180) storing media content and affiliated with a content provider that interacts with the media system 1000. In another aspect, a data source can include a data store that stores media content remote from a content provider or a content distribution system. In an aspect, media system 1000 (and additional systems described in this disclosure) are provided on a client device. In an aspect, a client device or media system 1000 (or additional systems described in this disclosure) can be configured to receive video 160 via a network such as for example the Internet, intranet, or cellular service.

According to an embodiment, streaming component 1010 receives video in a manner that enables a client device to play the video in a desired rating format. In an aspect, streaming component receives an adaptable rating format video file. The received adaptable rating format video file can be played upon completion of a receipt of stored in storage component 1060 for playing at a later time. In another aspect, streaming component 1010 receives a subset of video segments of a video 160. According to this aspect, the video can comprise of multiple segments where at least one of the segments is provided in different rating formats and available for streaming. For example, the subset of video segments received by the streaming component 1010 can be provided in a first M3U playlist and embody a first rating format. The first rating format can be afforded by the exclusion of video segments in a second rating format and the inclusion of those video segments in a first rating format. For example, the first rating format can be afforded by the exclusion of those video segments having a PG rating and the inclusion of only those segments having a G rating. The subset of video segments can further be provided in another M3U playlist and embody another rating format of the video by the inclusion of those video segments in the first rating format and the second rating format. For example, the other rating format can be afforded by the inclusion of both those segments having a G rating and those segments having a PG rating. In view of the above, it can be appreciated that the streaming component 1010 may receive a subset of video segments that includes the total video segments of a video.

Identification component 1020 determines a desired rating format for a video where a video is available in multiple rating formats. In an embodiment, the identification component 1020 determines the desired rating format for a video to be played as a function of authorization information associated with a user and/or client device. In an aspect, authorization information can be stored in memory 150 and accessed by the identification component 1020. According to this aspect, a video viewer/user may be permitted to view a video in various versions based on authorization information associated with the user via his or her client device. For example, the MPAA ratings restrict viewing audiences at the ages of 13 and 17. In an aspect, the identification component 1020 determines the desired rating format for a video to be played as a function of user age. Further, in an aspect, the user's age can be associated with and provided by the user's client device. Thus authorization information can include a user's age and the identification component 1020 can determine a desired rating format which has been previously deemed appropriate for the user's age either by the MPAA system, or another rating system.

In another aspect, authorization information can authorize viewing of a video based on parameters tailored to the user and/or the client device associated with a user. For example, a user device may provide the identification component 1020 with tailored information providing parameters for authorization of viewing videos in different rating formats. According to this aspect, authorization information may generally authorize an individual to view videos in any rating format, regardless of generally accepted age restrictions. For example, the authorization information may authorize an individual who is 15 to view videos only in G rated formats. Still in yet another aspect, the authorization information may authorize viewing of videos in a first rating format during weekdays and a second rating format during weekends. Still in yet another aspect, the authorization information may account for a variety of factors including a user's age, location, context, a videos title, a video's cast, a video's producer, or a videos reviews. Authorization information can further provide various parameters for authorization of a viewing of video segments based on the ratings of the segments and the content basis for which the respective ratings are attributed. For example, authorization information can authorize a user to view only PG-13 rated video segments and below which are afforded the rating for adult content and/or profanity. However, the authorization information may also authorize the same user to view video segments having an R rating an below where the R rating is attributable to violence.

Selection component 1030 selects and requests video based on an identified desired rating format. In an aspect, a user may request to receive a video as an adaptable rating format video file. In turn the selection component 1030 selects and requests the video as the adaptable rating format video file. In another aspect, a user may request a video and the identification component determines the desired rating format for the video. In turn, the selection component 1030 can select the appropriate video segments for streaming to the streaming component 1010 which result in a rendering of the video in the desired rating format. For example, each segment of a video can be associated with a rating and the rating format of a subset of video segments is a product of the respective ratings of the segments included therein. In an aspect, the rating format of a video is a function of the highest rated video segment. For example, the MPAA rating system rate movies a G, PG, PG-13, R, and X, where G is the lowest rating and X is the highest rating. According to the MPAA rating system, if a video includes an R rated segment as its highest rated segment it will be afforded an R rating. In an aspect, the selection component 1030 selects and requests a desired rating format for at least one video segment of a video where the video has multiple segments and at least one of the segments has a different rating format from another.

In an aspect, the selection component 1030 selects a desired rating format for the at least one segment as a function of a total desired rating to be afforded to the video. For example, if a desired rating format for a video is PG-13, the identification component 1020 determines a desired rating format for each of the video segments to have a rating of PG-13 or below. In turn, the selection component 1030 selects and requests the subset of video segments to be streamed (i.e. the M3U playlist version of the video) based in part on the desired rating format. For example, the identification component 1020 may determine that a video should have a G rating format. In turn, the selection component 1030 can select and request the subset of video segments of a video which have a G rating only.

In another embodiment, the identification component 1020 may determine a nontraditional or hybrid rating format for a video to be played based on different ratings for different video segments. According to this embodiment, a video segment may receive a rating for a variety of reasons. For example, a video segment may be afforded an R rating for adult content or violence. In an aspect, a user or parent of a user may be comfortable with viewing some segments of a video in a first rating and not comfortable with viewing other segments of the video in the first rating where the basis for first rating in the various segments is different. For example, a user or parent of a user may be comfortable with viewing R rated video segments wherein the R rating is attributed to violence, however the user or parent of the viewer may not be comfortable with viewing R rated segments of video wherein the R rating is attributed to adult content. In that case, the user or parent of the user may be only comfortable with viewing adult content video segments having a PG-13 rating.

In view of the example above, rather than restricting viewing of the entire video to only those segments having a PG-13 rating and below, the identification component 1020 can determine a hybrid version of the video that has different rated segments based on content based characteristics of those segment. For example, the identification component 1020 can determine a first desired rating format for a first video segment, and a second desired rating format for a second video segment, wherein the first desired rating format is different from the second desired rating format. In turn, the selection component 1030 can select and request the subset of video segments to be streamed based in part on the desired rating formats. When selecting a subset of video segments to be received based in part on two or more desired rating formats conditioned upon content, the selection component 1030 can select a hybrid M3U playlist version of the video.

Figure 11:
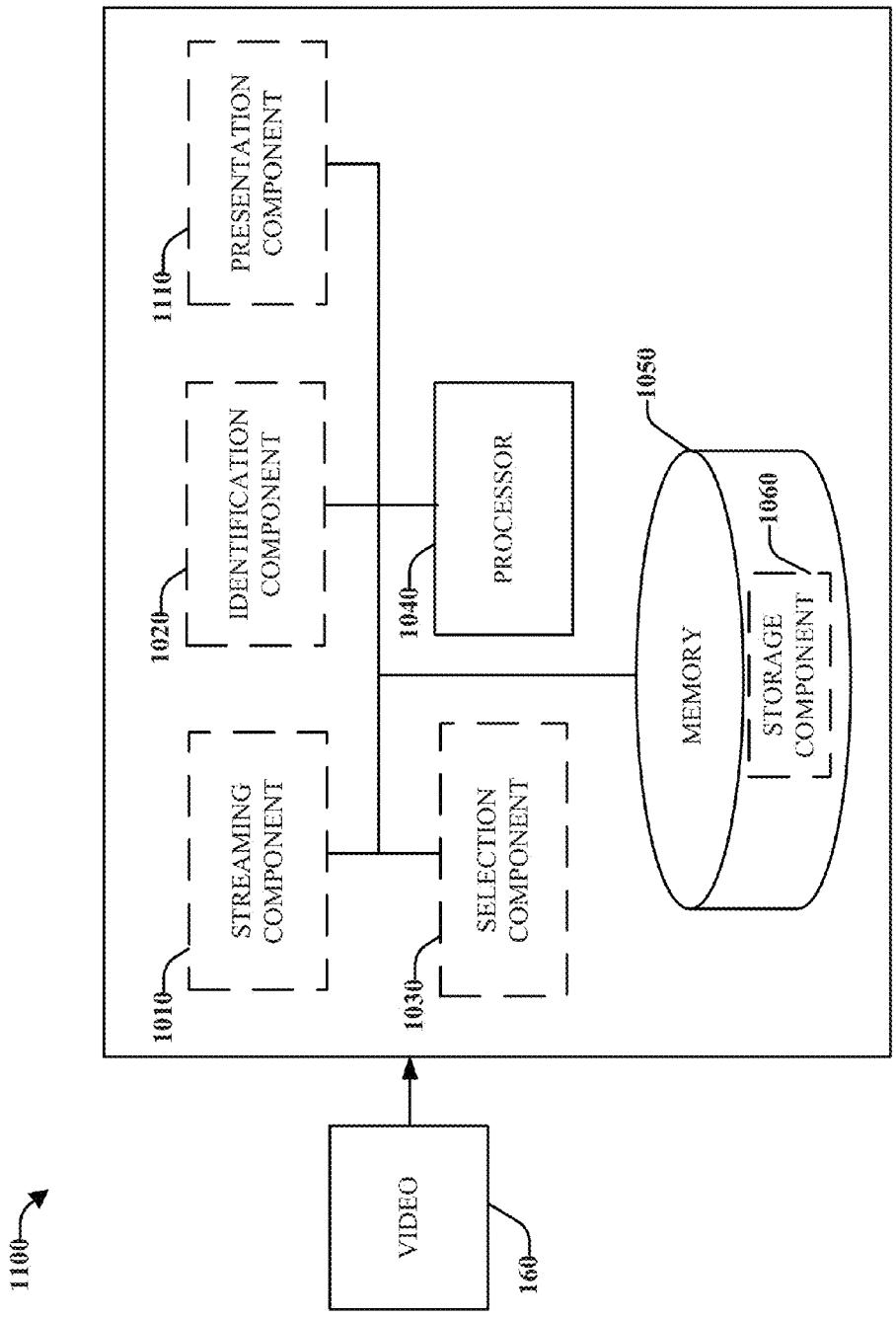
FIG. 11 illustrates an example non-limiting system that facilitates receiving video in multiple rating formats in accordance with various aspects and implementations described herein.

With reference to FIG. 11, presented is another exemplary non-limiting embodiment of a media system 1100 that facilitates receiving video in multiple rating formats in accordance with the subject disclosure. In an aspect, system 1100 facilitates the displaying and playing of video in multiple rating formats. System 1100 can include presentation component 1110 that plays video received by streaming component. In an aspect, presentation component 1110 is configured to play videos that are received in an adaptable rating format. In another aspect, presentation component 1110 plays a subset of streamed video segments (i.e. a video M3U playlist of a video in a desired rating format) received by the streaming component 1010.

An adaptable rating format video file can comprise multiple rated versions of the same video segment and be the formatted to play one of the multiple rated versions of the same video segments based on a receiving device. For example, an adaptable rating format video file can comprise XML encoding or a cue segment providing read rules. Presentation component 1110 can read and play video in an adaptable rating format in accordance with the read rule encoded therein.

For example, a single video file can comprise of multiple segments wherein one or more of the segments are associated with a different rating. The single video file can further be encoded in a language such as extensible markup language (XML) or other machine readable language, that defines parameters for playing subsets of the multiple different segments. For example, a single video may comprise segments A, B1, B2, and C and may be encoded to be played as segments A, B1, and C as a default on any client device. The video file may further be encoded to be played as segments A, B2, and C on a client device providing authorization information to allow playing of segments A, B2, and C. According to this example, version A/B1/C can result in the playing of a G rated version of the video file while playing of version A/B2/C can result in a PG13 rated version of the video file. Presentation component 1110 can employ identification component 1020 to determine the appropriate rating format for rendering of an adaptable rating format video and in turn, play the video file such that the appropriate rating format of the video is presented.

The presentation component 1110 can present video at any suitable type of device that receives media files, for example a mobile phone, a tablet computer, a desktop computer, a server system, a personal computer, a cable set top box, a satellite set top box, a cable modem, a television set, an internet-enabled television, a television computer device media extender device, a video cassette recorder device, a Blu-ray device, DVD (digital versatile disc or digital video disc) device, a compact disc device, a video game system, an audio/video receiver, radio device, a portable music player, a navigation system, a car stereo, and etc.

Respective devices often have different capabilities and limitations (e.g., screen size, decoders . . . ). In an aspect, the presentation component 1110 can provide presentation options in accordance with different device capabilities or limitations. For example, data rendering capabilities may be more limited in a mobile device (e.g., a smart-phone) than in a fixed computing device (e.g., a desktop computer), more effort may be required of a user to consume content such as a video (or other information) from the mobile device than would be required of the user in viewing the same video from a fixed computing device. In addition, because displays of various mobile devices are often smaller than displays in fixed computing devices, it may be possible only to display a relatively small amount of information at any given time on a mobile device. The presentation component 1110 can thus optimize display of options and content for respective devices. Finally, data connections between a mobile device and various networked resources (e.g., the Internet) may be slower than corresponding data connections between a fixed computing device and the same networked resources. Accordingly, the presentation component 1110 can generate user options to account for variations in device functionality and available bandwidth for consumption and rendering of media content.

In an aspect, the presentation component 1110 can automatically configure or present user options to consume video or audio content based on encoding parameters such as, rating format encoding, video resolution, video frame rate, video bit rate, video codec, audio codec, audio channels, audio bit rate, etc. Thus the presentation component 1110 or a user may choose a format to consume content that best suits capabilities of specific consumption mediums, available bandwidth, file size, processing capabilities, screen resolution, screen size, available encoders, available decoders, etc.

Figure 12:
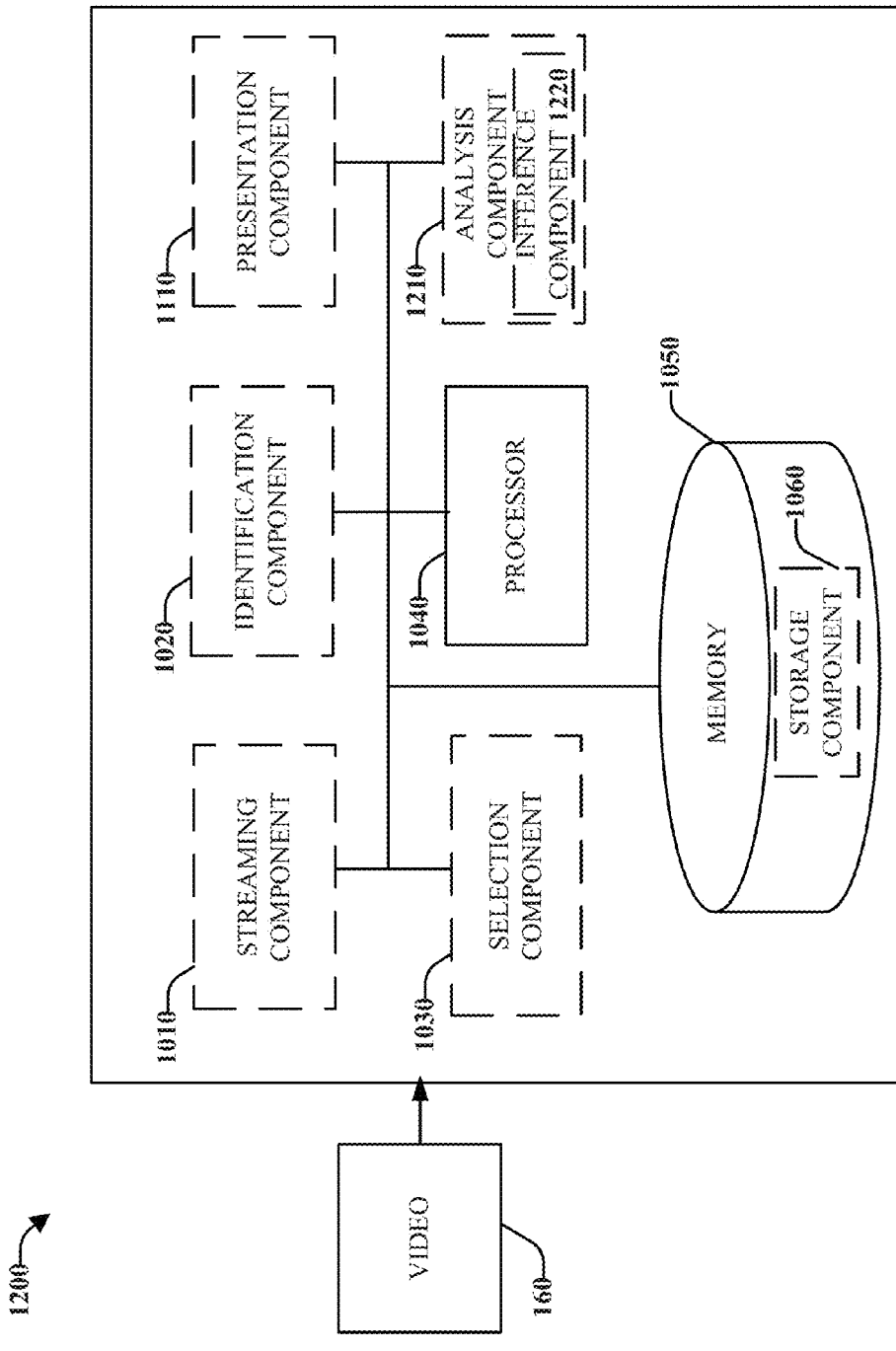
FIG. 12 illustrates an example non-limiting system that facilitates receiving video in multiple rating formats in accordance with various aspects and implementations described herein.

With reference to FIG. 12, presented is another exemplary non-limiting embodiment of a media system 1200 that facilitates receiving video in multiple rating formats in accordance with the subject disclosure. In an aspect, system 1200 facilitates receiving video in multiple rating formats based on an identified desired rating format. System 1200 can include analysis component 1210 that can aid in various determinations and/or inferences upon which the identification component 1010 may determine a desired rating format of video segments to be received by the streaming component.

In an aspect, analysis component 1210 determines the context of a client device at which a video is to be played or is being played. In turn, the identification component 1020 can determine the desired rating format for the subset of video segments received by the streaming component 1010 as a function of the client device context. In particular, the identification component 1020 can identify a rating format for the subset of video segments to be streamed to the client device which are appropriate given the context of the client device.

The context of a client device can include any information related to the physical environment of a client device as well as the virtual activity and/or usage of the client device and surrounding devices. In an embodiment, the context of a client device can include the location of the client device, the characteristics of the devices and their associated users surrounding the client device, as well as characteristics of individuals within viewing range of a client device.

Analysis component 1210 can employ any suitable method or means for determining location of a client device. In an aspect, the analysis component 1210 can employ a global positioning system (GPS) in order to determine the location of a client device. In another aspect, the analysis component 1210 can employ assisted GPS (AGPS), time based locating methods, multilateration, or any other mobile device tracking methods. In particular, in an aspect, the analysis component 1210 can be configured to determine location of a client device inside enclosed or covered structures, such as buildings.

In an embodiment, context includes characteristics of users surrounding a client device. For example, the analysis component 1210 may determine the ages of users or individuals within viewing proximity and/or auditory range of a client device at which a video is being played. Similarly, the analysis component 1210 may determine viewing authorization information of users and/or individuals within viewing proximity and/or auditory range of a client device at which a video is being played. In an aspect, the analysis component 1210 can determine the youngest age of one or more users or individuals within viewing proximity and/or auditory range of a client device. In turn, the identification component 1020 can determine the desired rating format as a function of the youngest age of the one or more users or individuals viewing proximity and/or auditory range of a client device at which a video is being played.

In an aspect, the analysis component 1210 can determine changes in context of a client device in which a video is being played. For example, the analysis component 1210 can determine when a new user begins to view and/or play a video at a client device or when a new user or individual becomes within viewing proximity and/or auditory range of a client device at which a video is being played. In turn, the selection component 1030 can update the selected and requested subset of video segments to be streamed to the streaming component 1010 as a function of the new user. For example, the selection component can update the selected and requested subset of video segments to be streamed to the streaming component 1010 as a function of age and/or authorization information of the new user.

In an embodiment, the analysis component 1210 can employ an inference component 1220 to facilitate making inferences or determinations in connection with determining client device context. In addition, inference component 1220 can facilitate the identification component 120 in inferring and/or determining an appropriate rating format for segments of a video to be played at a client device as a function of device context, user preferences, user age, user authorization information, user demographics, user location, and user viewing intent.

Figure 13:
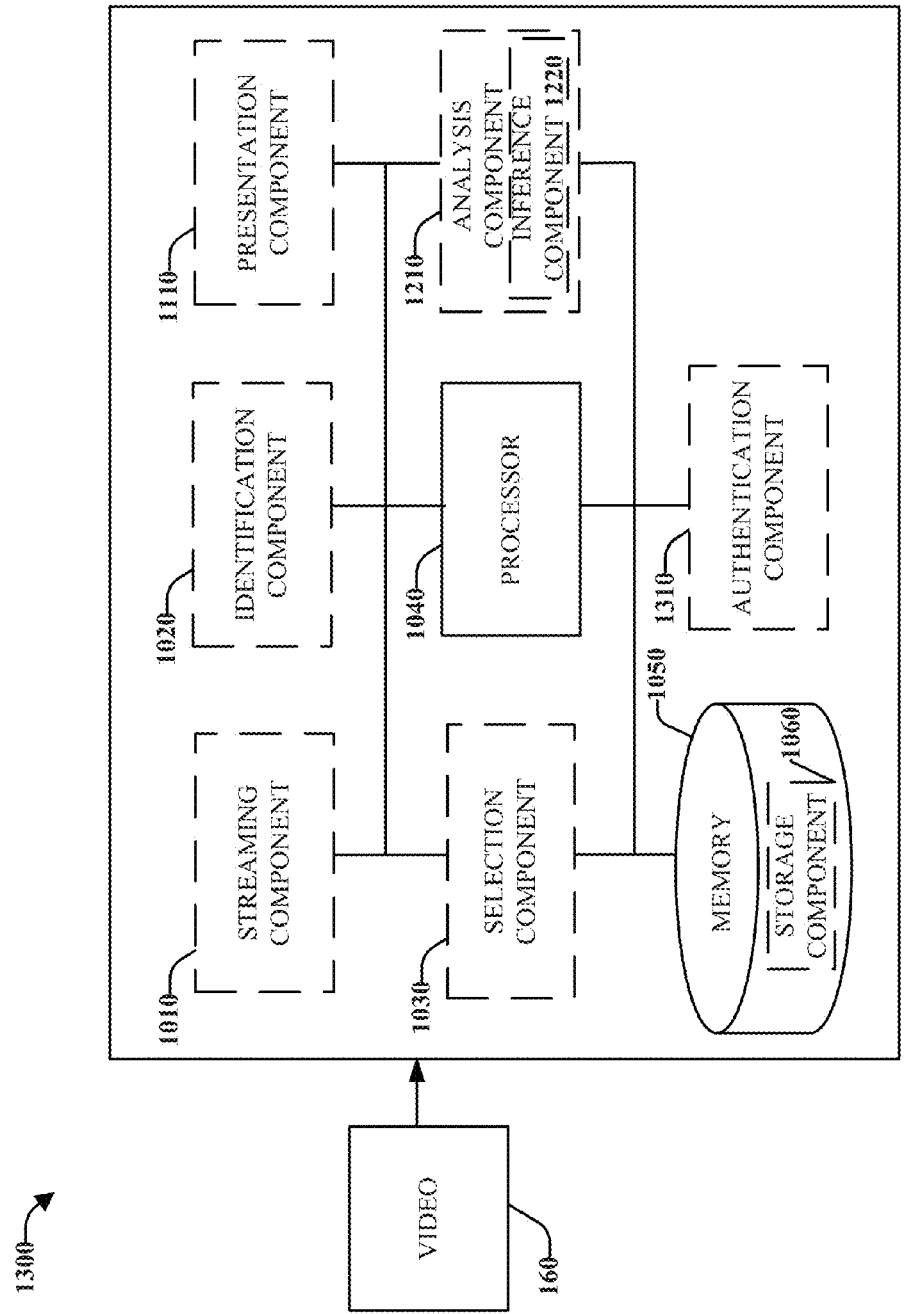
FIG. 13 illustrates an example non-limiting system that facilitates receiving video in multiple rating formats in accordance with various aspects and implementations described herein.

With reference to FIG. 13, presented is another exemplary non-limiting embodiment of a media system 1200 that facilitates receiving video in multiple rating formats in accordance with the subject disclosure. System 1300 employs authentication component 1310 to determine the age of one or more users that the subset of video segments will be displayed to on a client device. In an aspect, authentication component 1310 determines the ages of one or more based on context information determined by the analysis component 1210. In another aspect, the authentication component 1310 determines the age of the one or more user to which video segments are being streamed through authentication information stored in or associated with a client device at which the video segments are being streamed to. For example, multiple users may provide login and identification information at a client device application or browser in order to view video segments. According to this example, the authentication component 1310 can determine the authorization information of the user's, such as their age's, based on their login and identification information. Further, the identification component 1020 can select the desired rating format for segments of a video to be streamed to the streaming component as a function of the youngest age of the one or more users.

Figure 14:
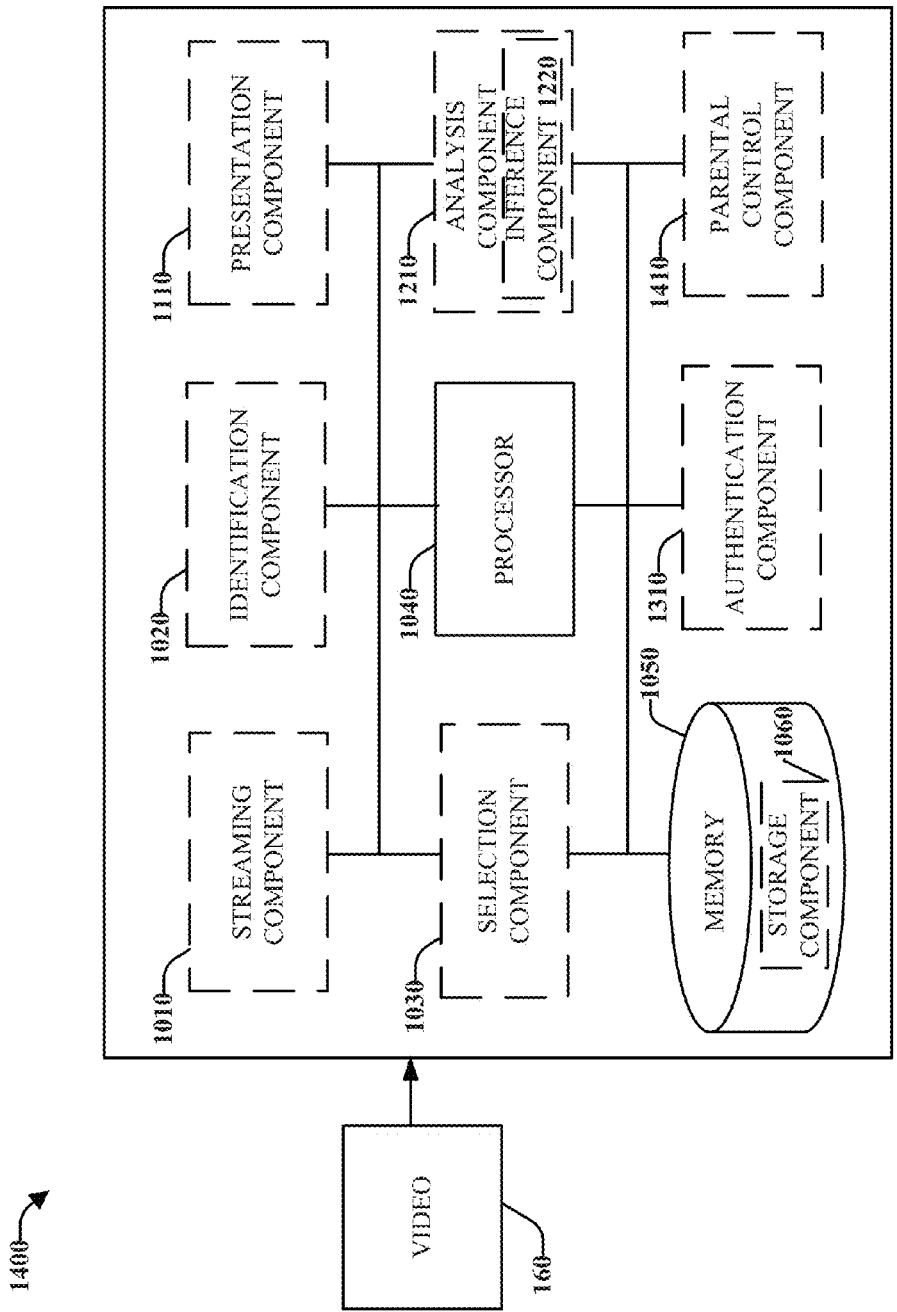
FIG. 14 illustrates an example non-limiting system that facilitates receiving video in multiple rating formats in accordance with various aspects and implementations described herein.

With reference to FIG. 14, presented is another exemplary non-limiting embodiment of a media system 1400 that facilitates receiving video in multiple rating formats in accordance with the subject disclosure. Permission to view movies in various rating formats is often policed by parents or guardians of children. In addition, permission to view videos in various formats in general may be required by a school system or other authoritative entity. System 1400 includes parental control component 1410 that facilitates policing and authorizing permissions to view videos segments in various rating formats. In an aspect, parental control component 1410 sets one or more default rating formats for subsets of video segments to be streamed to streaming component 1010. In an aspect, parental control component 1410 allows a parent, guardian, or otherwise authoritative personnel to manually set parameters governing viewing permissions of users of a client device at which a video segments are to be streamed. For example, a mother may have several children on a family phone plan. She may employ the parental control component 1410 to set limits on the rating formats each of her children may view on their respective smartphone devices. In another aspect, the parental control component 1410 may automatically provide default settings for viewing videos in desired rating formats based on a users age or context. The parental control component 1410 can employ various security provisions that enable only authorized individuals to set or modify default format requirements.

Figure 15:
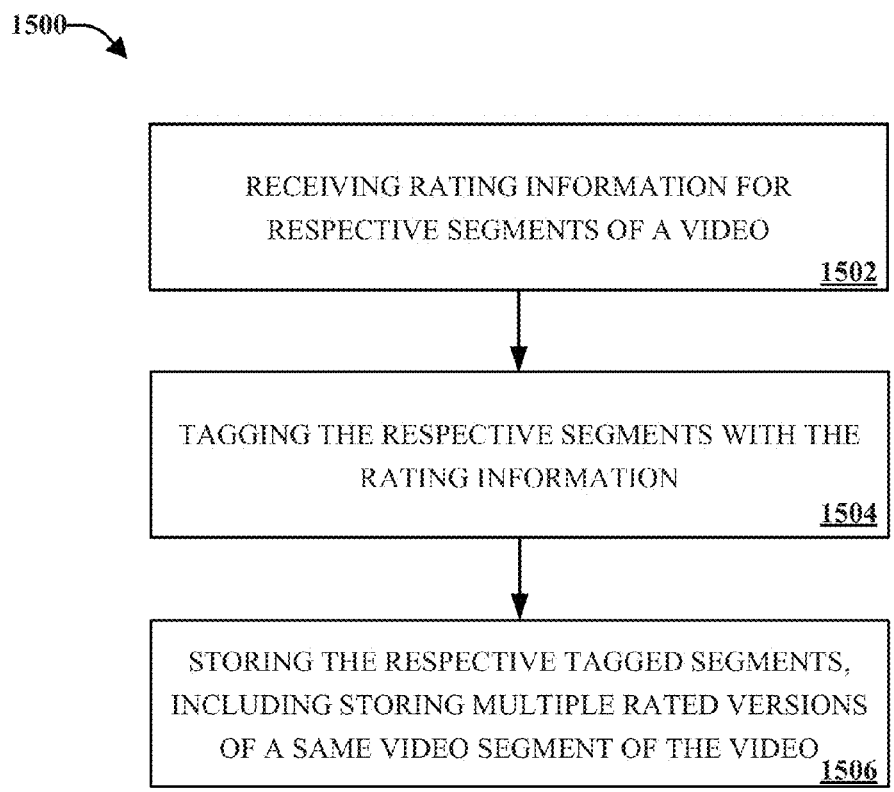
FIG. 15 illustrates an example methodology for providing video in multiple rating formats in accordance with various aspects and implementations described herein.
Figure 16:
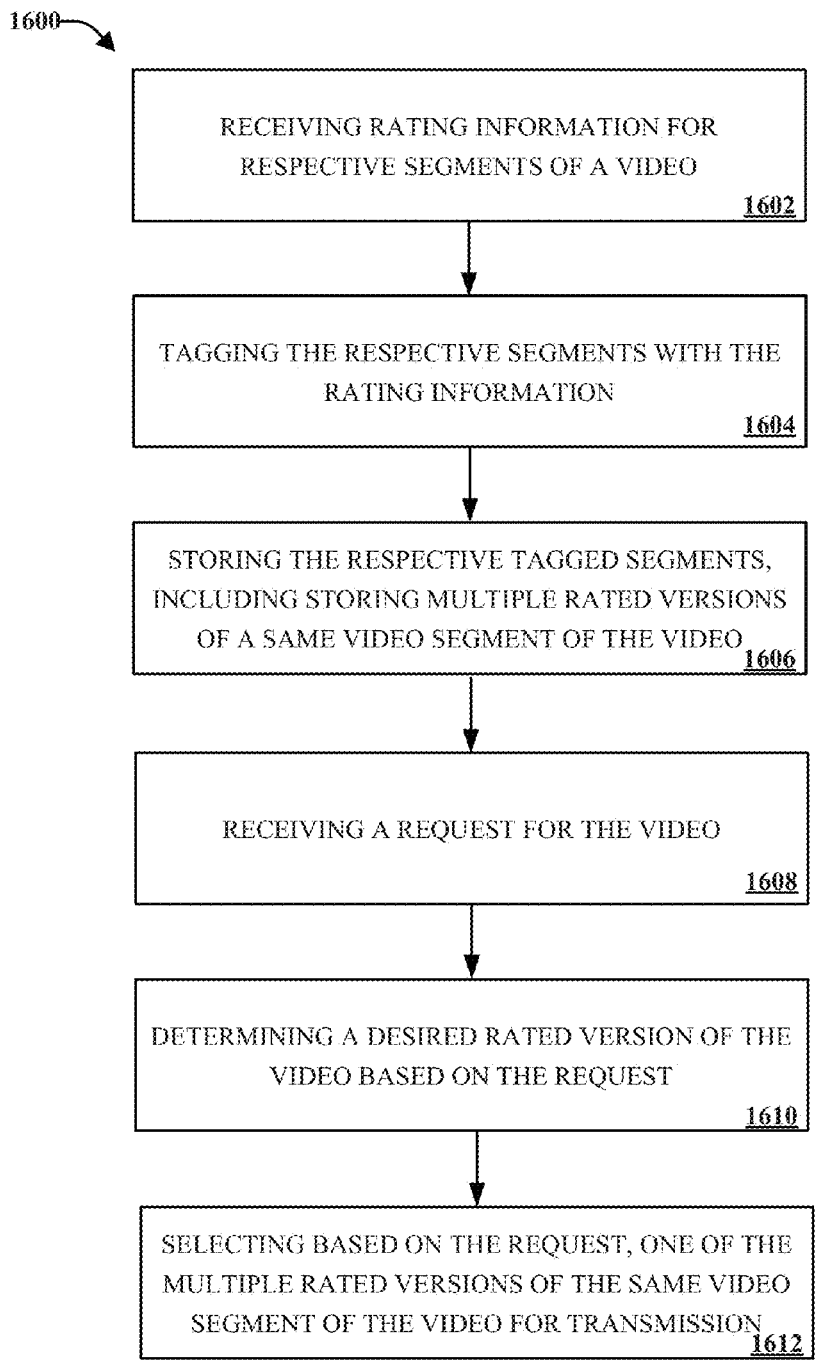
FIG. 16 illustrates another example methodology for providing video in multiple rating formats in accordance with various aspects and implementations described herein.
Figure 17:
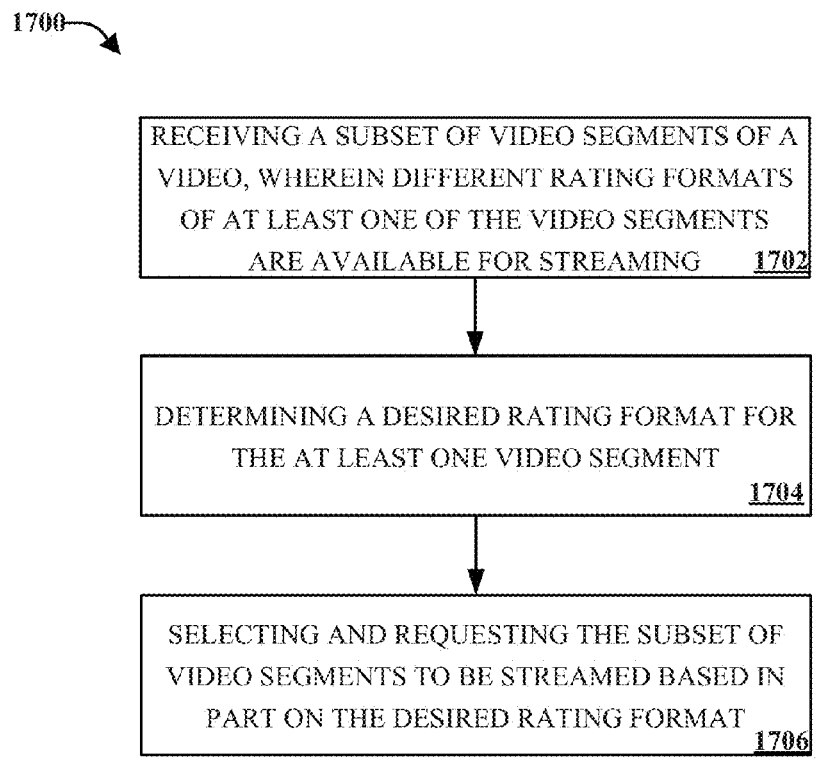
FIG. 17 illustrates an example methodology for receiving video in multiple rating formats in accordance with various aspects and implementations described herein.

FIGS. 15-17 illustrates methodologies or flow diagrams in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 15 presented is a flow diagram of an example application of systems disclosed in this description accordance with an embodiment. In an aspect, exemplary methodology 1500 of a system for providing video in multiple rating formats is stored in a memory and utilizes a processor to execute computer executable instructions to perform functions. At 1502, rating information is received for respective segments of a video, (e.g. using rating component 110). At 1504, the respective segments are tagged with the rating information, (e.g. using tagging component 120). At 1506, the respective tagged segments, including multiple rated versions of a same video segment of the video, are stored (e.g. using storage component 180).

Referring now to FIG. 16 presented is a flow diagram of another example application of systems disclosed in this description accordance with an embodiment. In an aspect, exemplary methodology 1600 of a system for providing video in multiple rating formats is stored in a memory and utilizes a processor to execute computer executable instructions to perform functions. At 1602, rating information is received for respective segments of a video, (e.g. using rating component 110). At 1604, the respective segments are tagged with the rating information, (e.g. using tagging component 112). At 1606, the respective tagged segments, including multiple rated versions of a same video segment of the video, are stored (e.g. using storage component 180). At 1608, a request is received for the video, (e.g. using request component 130). At 1610, a desired rating version of the video is determined based on the request (e.g. using identification component 610). Then at 612, one of the multiple rated versions of the same video segment of the video is selected for transmission (e.g. using selection component 620).

Referring now to FIG. 17 presented is a flow diagram of an example application of systems disclosed in this description accordance with an embodiment. In an aspect, exemplary methodology 1700 of a system for receiving video in multiple rating formats is stored in a memory and utilizes a processor to execute computer executable instructions to perform functions. At 1702, a subset of video segments of a video are received, (e.g. using streaming component 1010) wherein different rating formats of at least one of the video segments are available for streaming. At 1704, a desired rating format for the at least one video segment is determined (e.g. using the identification component 1020). At 1706, the subset of the video segments to be streamed is selected and requested based in part on the desired rating format (e.g. using the selection component 1030).

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described in this disclosure. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described in this disclosure, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described in this disclosure, and similarly, storage can be effected across a plurality of devices. Accordingly, the invention is not to be limited to any single embodiment, but rather can be construed in breadth, spirit and scope in accordance with the appended claims.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 18:
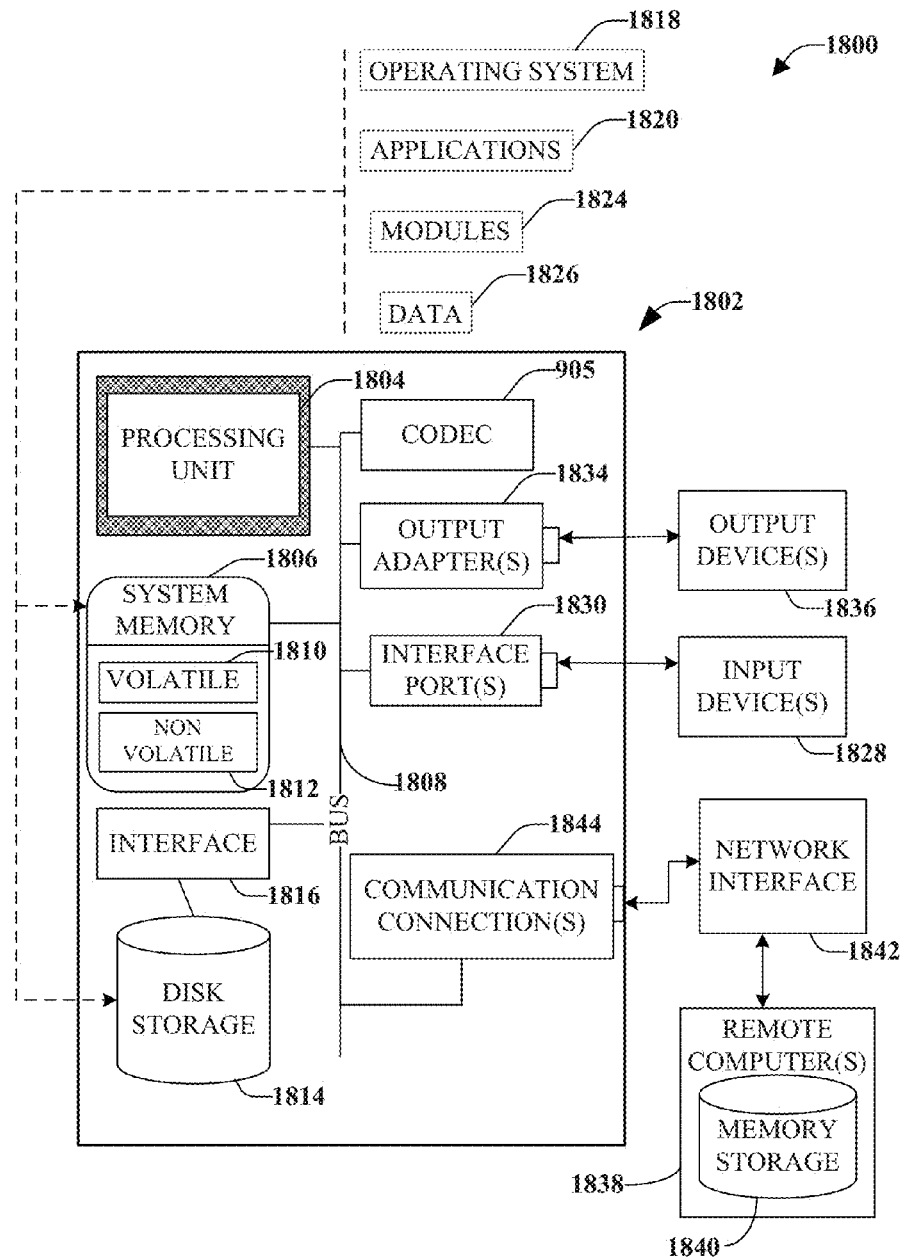
FIG. 18 is a block diagram representing an exemplary non-limiting networked environment in which various embodiments can be implemented in accordance with various aspects and implementations described herein.

With reference to FIG. 18, a suitable environment 1800 for implementing various aspects of the claimed subject matter includes a computer 1802. The computer 1802 includes a processing unit 1804, a system memory 1806, a codec 1805, and a system bus 1808. In an aspect, processing unit 1804 and system memory 1806 can represent processors 150,1040 and memories 170, 1050 respectively. The system bus 1808 couples system components including, but not limited to, the system memory 1806 to the processing unit 1804. The processing unit 1804 can be any of various available processors. Dual microprocessors and other multiprocessor architectures also can be employed as the processing unit 1804.

The system bus 1808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 13184), and Small Computer Systems Interface (SCSI).

The system memory 1806 includes volatile memory 1810 and non-volatile memory 1812. The basic input/output system (BIOS), containing the basic routines to transfer information between elements within the computer 1802, such as during start-up, is stored in non-volatile memory 1812. In addition, according to present innovations, codec 1805 may include at least one of an encoder or decoder, wherein the at least one of an encoder or decoder may consist of hardware, a combination of hardware and software, or software. Although, codec 1805 is depicted as a separate component, codec 1805 may be contained within non-volatile memory 1812. By way of illustration, and not limitation, non-volatile memory 1812 can include read only memory (ROM), programmable ROM (PROM), electrically programmable ROM (EPROM), electrically erasable programmable ROM (EEPROM), or flash memory. Volatile memory 1810 includes random access memory (RAM), which acts as external cache memory. According to present aspects, the volatile memory may store the write operation retry logic (not shown in FIG. 18) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1802 may also include removable/non-removable, volatile/non-volatile computer storage medium. FIG. 18 illustrates, for example, disk storage 1814. Disk storage 1814 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1814 to the system bus 1808, a removable or non-removable interface is typically used, such as interface 1816.

It is to be appreciated that FIG. 18 describes software that acts as an intermediary between users and the basic computer resources described in the suitable operating environment 1800. Such software includes an operating system 1810. Operating system 1810, which can be stored on disk storage 1814, acts to control and allocate resources of the computer system 1802. Applications 1820 take advantage of the management of resources by operating system 718 through program modules 1824, and program data 1826, such as the boot/shutdown transaction table and the like, stored either in system memory 1806 or on disk storage 1814. It is to be appreciated that the claimed subject matter can be implemented with various operating systems or combinations of operating systems.

A user enters commands or information into the computer 1802 through input device(s) 1828. Input devices 1828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1804 through the system bus 1808 via interface port(s) 1830. Interface port(s) 1830 include, for example, a serial port, a parallel port, a game port, and a universal serial bus (USB). Output device(s) 1836 use some of the same type of ports as input device(s) 1828. Thus, for example, a USB port may be used to provide input to computer 1802, and to output information from computer 1802 to an output device 1836. Output adapter 1834 is provided to illustrate that there are some output devices 1836 like monitors, speakers, and printers, among other output devices 1836, which require special adapters. The output adapters 1834 include, by way of illustration and not limitation, video and sound cards that provide a means of connection between the output device 1836 and the system bus 1808. It should be noted that other devices and/or systems of devices provide both input and output capabilities such as remote computer(s) 1838.

Computer 1802 can operate in a networked environment using logical connections to one or more remote computers, such as remote computer(s) 1838. The remote computer(s) 1838 can be a personal computer, a server, a router, a network PC, a workstation, a microprocessor based appliance, a peer device, a smart phone, a tablet, or other network node, and typically includes many of the elements described relative to computer 1802. For purposes of brevity, only a memory storage device 1840 is illustrated with remote computer(s) 1838. Remote computer(s) 1838 is logically connected to computer 1802 through a network interface 1842 and then connected via communication connection(s) 1844. Network interface 1842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1844 refers to the hardware/software employed to connect the network interface 1842 to the bus 1808. While communication connection 1844 is shown for illustrative clarity inside computer 1802, it can also be external to computer 1802. The hardware/software necessary for connection to the network interface 1842 includes, for exemplary purposes only, internal and external technologies such as, modems including regular telephone grade modems, cable modems and DSL modems, ISDN adapters, and wired and wireless Ethernet cards, hubs, and routers.

Figure 19:
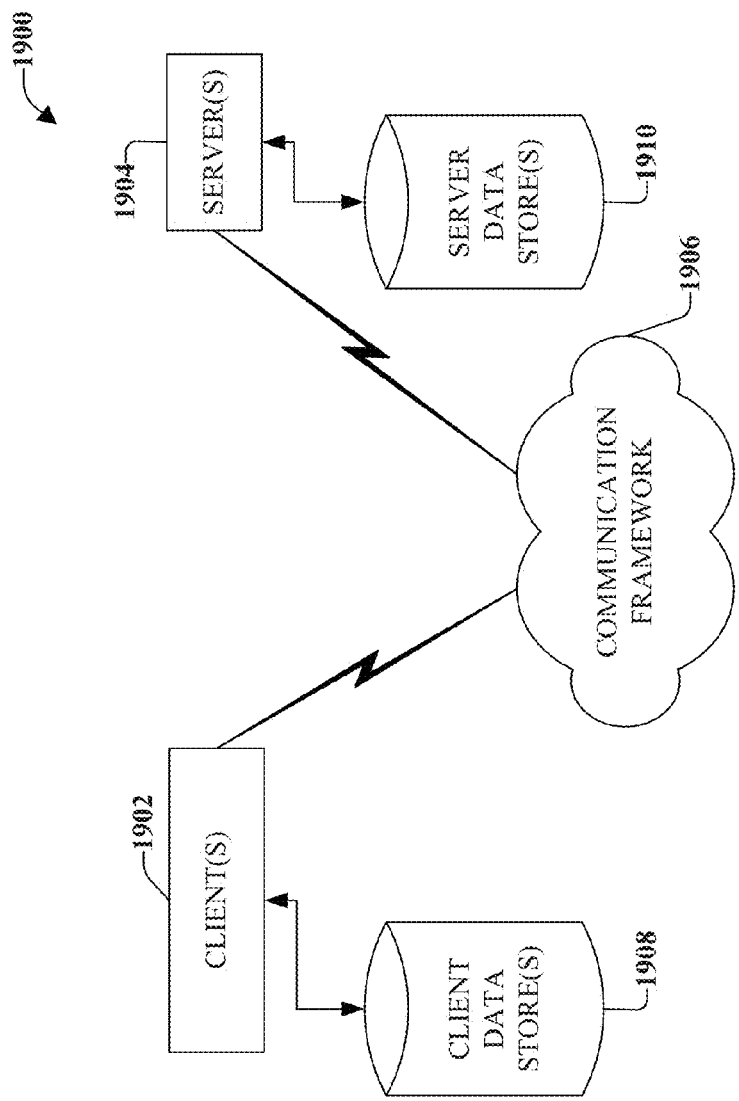
FIG. 19 is a block diagram representing an exemplary non-limiting computing system or operating environment in which various embodiments may be implemented in accordance with various aspects and implementations described herein.

Referring now to FIG. 19, there is illustrated a schematic block diagram of a computing environment 1900 in accordance with this disclosure. The system 1900 includes one or more client(s) 1902 (e.g., laptops, smart phones, PDAs, media players, computers, portable electronic devices, tablets, and the like). System 1900 can for example be employed in connection with implementing one or more of the systems or components described herein and shown FIGS. 1, and 6-14. The client(s) 1902 can be hardware and/or software (e.g., threads, processes, computing devices). The system 1900 also includes one or more server(s) 1904. The server(s) 1904 can also be hardware or hardware in combination with software (e.g., threads, processes, computing devices). The servers 1904 can house threads to perform transformations by employing aspects of this disclosure, for example. One possible communication between a client 1902 and a server 1904 can be in the form of a data packet transmitted between two or more computer processes wherein the data packet may include video data. The data packet can include metadata, e.g., associated contextual information, for example. The system 1900 includes a communication framework 1906 (e.g., a global communication network such as the Internet, or mobile network(s)) that can be employed to facilitate communications between the client(s) 1902 and the server(s) 1904.

Communications can be facilitated via a wired (including optical fiber) and/or wireless technology. The client(s) 1902 include or are operatively connected to one or more client data store(s) 1908 that can be employed to store information local to the client(s) 1902 (e.g., associated contextual information). Similarly, the server(s) 1904 are operatively include or are operatively connected to one or more server data store(s) 1910 that can be employed to store information local to the servers 1904.

In one embodiment, a client 1902 can transfer an encoded file, in accordance with the disclosed subject matter, to server 1904. Server 1904 can store the file, decode the file, or transmit the file to another client 1902. It is to be appreciated, that a client 1902 can also transfer uncompressed file to a server 1904 and server 1904 can compress the file in accordance with the disclosed subject matter. Likewise, server 1904 can encode video information and transmit the information via communication framework 1906 to one or more clients 1902.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
    at least one non-transitory computer readable medium having stored therein computer-executable components;
    at least one microprocessor that executes the following computer executable components stored on the at least one non-transitory computer readable medium:
        an identification component that determines a first rating format for a video to be streamed based in part on a first viewing context for the video, wherein the video comprises a plurality of segments respectively associated with rating information;
        a selection component that sends a request to a streaming media provider to play the video in the first rating format;
        a streaming component that receives, in response to the request, a first subset of the plurality of segments streamed from the streaming media provider via a network, wherein the first subset of the plurality of segments are associated with rating information reflecting the first rating format for the video;
        a presentation component that plays the video in the first rating format in response to receipt of the first subset of the plurality of segments; and
        an analysis component that identifies a change in the first viewing context during playing of the video in the first rating format, wherein in response to the change,
            the identification component identifies a second rating format for the video based on the change in the first viewing context,
            the selection component sends another request to the streaming media provider to play the video in the second rating format;
            the streaming component receives, in response to the other request, a second subset of the plurality of segments streamed from the streaming media provider via the network, wherein the second subset of the plurality of segments are associated with rating information reflecting the second rating format for the video, and
            the presentation component switches playing of the video from the first rating format to the second rating format in response to receipt of the second subset of the plurality of segments.

2. The system of claim 1, wherein the streaming component receives the first and second subsets of the plurality of segments over the network using an internet based protocol wherein segments in the first and second subsets are received as a series of hypertext transfer protocol downloads.

3. The system of claim 2, wherein the internet based protocol is hypertext protocol live streaming.

4. The system of claim 1, wherein the streaming component further receives an advertisement with the first or second subset of segments, and wherein the advertisement is pre-associated with at least one segment of the first or second subset of segments based on rating information tagged thereto.

5. The system of claim 1, further comprising:
    a parental control component that sets one or more default rating formats for the video to be streamed.

6. The system of claim 1, wherein the identification component determines the first rating format based in part on rating authorization information associated with a device at which the video will be played.

7. The system of claim 1, wherein the analysis component determines the change in the first viewing context as a function of a location of a device at which the presentation component plays the video.

8. The system of claim 1, wherein the analysis component determines the change in the first viewing context as a function of a change in a determined youngest age of a person within audible range of a device at which the presentation component plays the video.

9. The system of claim 8, wherein the analysis component determines the youngest age of the person within audible range of the device is based on determined ages of a plurality of persons within audible range of the device.

10. A method comprising:
 using at least one microprocessor to execute computer executable instructions stored on at least one non-transitory computer readable medium to perform the following acts:
  determining a first rating format for a video to be streamed based in part on a first viewing context for the video, wherein the video comprises a plurality of segments respectively tagged with rating information;
  sending a request to a streaming media provider to play the video in the first rating format;
  receiving, in response to the request, a first subset of the plurality of segments from the streaming media provider via a network, wherein the first subset of the plurality of segments are tagged with rating information reflecting the first rating format for the video;
  playing the video in the first rating format in response to the receiving the first subset of the plurality of segments;
  identifying a change in the first viewing context during playing of the video in the first rating format, wherein in response to the change;
  identifying a second rating format for the video based on the change in the first viewing context;
  sending another request to the streaming media provider to play the video in the second rating format;
  receiving, in response to the other request, a second subset of the plurality of segments streamed from the streaming media provider via the network, wherein the second subset of the plurality of segments are associated with rating information reflecting the second rating format for the video; and
  switching the playing of the video from the first rating format to the second rating format in response to the receiving the second subset of the plurality of segments.

11. The method of claim 10, wherein the receiving the first and second subsets of the plurality of segments comprises receiving segments of the first and second subsets over the network using an internet based protocol as a series of hypertext transfer protocol downloads.

12. The method of claim 11, wherein the internet based protocol is hypertext protocol live streaming.

13. The method of claim 10, further comprising receiving an advertisement with the first or second subsets of segments, wherein the advertisement is pre-associated with at least one of the segments of the first or second subsets of segments based on rating information tagged thereto.

14. The method of claim 10, comprising setting one or more default rating formats for the video to be streamed.

15. The method of claim 10, wherein the determining the first rating format further comprises determining the first rating format based in part on rating authorization information associated with a device at which the video will be played.

16. The method of claim 10, wherein the determining the change in the first viewing context comprises determining the change in the first viewing context as a function of a location of a device at which the presentation component plays the video.

17. The method of claim 10, wherein the determining the change in the first viewing context comprises determining the change in the first viewing context as a function of a determined youngest age of a person within audible range of a device at which the presentation component plays the video.

18. The method of claim 17, wherein the determining the youngest age of the person within audible range of the device is based on determined ages of a plurality of persons within audible range of the device.

* * * * *